US012572690B2

(12) United States Patent
Gore et al.

(10) Patent No.: US 12,572,690 B2
(45) Date of Patent: Mar. 10, 2026

(54) DATA PRIVACY USING QUICK RESPONSE CODE

(71) Applicant: Truist Bank, Charlotte, NC (US)

(72) Inventors: Uday Gore, Atlanta, GA (US);
Josephine Middleton-Saulny, Atlanta,
GA (US); Phani Kumar Ankani,
Atlanta, GA (US); **Joseph Matthew
Law, Ankeny, IA (US); Giridhar
Polur, Cumming, GA (US); Seshadri
Chintalapati**, Charlotte, NC (US)

(73) Assignee: TRUIST BANK, Charlotte, NC (US)

( * ) Notice: Subject to any disclaimer, the term of this
patent is extended or adjusted under 35
U.S.C. 154(b) by 232 days.

(21) Appl. No.: 18/481,591

(22) Filed: Oct. 5, 2023

(65) Prior Publication Data

US 2025/0117514 A1     Apr. 10, 2025

(51) Int. Cl.
*G06F 21/62*          (2013.01)
*G06K 19/06*          (2006.01)

(52) U.S. Cl.
CPC ...  *G06F 21/6245* (2013.01); *G06K 19/06037*
(2013.01)

(58) Field of Classification Search
CPC ............. G06F 16/9554; G06F 21/6245; G06F
16/535; G06F 21/31; G06K 19/06037
USPC ............................................. 726/26; 713/189
See application file for complete search history.

(56) References Cited

U.S. PATENT DOCUMENTS

| | | | | |
|---|---|---|---|---|
| 9,722,790 | B2 * | 8/2017 | Ebrahimi | .............. H04L 9/3252 |
| 2017/0140174 | A1 * | 5/2017 | Lacey | ................ G06Q 20/4016 |
| 2018/0077542 | A1 * | 3/2018 | Xie | ........................ H04W 4/12 |
| 2020/0202037 | A1 | 6/2020 | Parkinson | |
| 2021/0125297 | A1 | 4/2021 | Doran | |
| 2021/0243185 | A1 | 8/2021 | Thasale | |
| 2021/0264492 | A1 * | 8/2021 | Brown | ............... G06Q 30/0623 |
| 2022/0139510 | A1 | 5/2022 | Romanychev | |

(Continued)

OTHER PUBLICATIONS

Ahamed MS, Mustafa HA. A secure QR code system for sharing
personal confidential information. In 2019 International Conference
on Computer, Communication, Chemical, Materials and Electronic
Engineering (IC4ME2) Jul. 11, 2019 (pp. 1-4). IEEE (Year: 2019).*

(Continued)

*Primary Examiner* — Syed A Zaidi

(74) *Attorney, Agent, or Firm* — Michael A. Springs,
Esq.; Shumaker, Loop & Kendrick, LLP; Patrick B.
Horne

(57)          ABSTRACT

A data privacy system and method is disclosed. The method
includes providing at least one processor, at least one
memory device including computer-readable instructions,
and at least one user device in communication with the at
least one processor via a network connection. The at least
one processor, upon execution of the computer-readable
instructions, is configured to generate a predictive model
during training of a machine learning program using a
training data set including a personal data set of one or more
users. The predictive model is configured to predict at least
one predicted data privacy and/or data portability measure of
at least one of the users. At least one quick response code
embedded with data or a link to the data based upon the at
least one predicted data privacy and/or data portability
measure is generated to provide enhanced data privacy
protection and data portability.

18 Claims, 12 Drawing Sheets

(56)         References Cited

U.S. PATENT DOCUMENTS

| | | |
|---|---|---|
| 2023/0004691 A1* | 1/2023 | Glunz ................ G06Q 30/0635 |
| 2023/0036188 A1* | 2/2023 | Schmidt ............. G06Q 20/3224 |
| 2023/0128760 A1* | 4/2023 | Lessman ................ G06Q 10/10 |
| | | 705/322 |
| 2023/0155837 A1* | 5/2023 | Matykiewicz ... G06K 19/06037 |
| | | 713/189 |
| 2024/0185300 A1* | 6/2024 | Bird ................... G06Q 30/0265 |
| 2024/0232560 A1 | 7/2024 | Durham |
| 2024/0394987 A1* | 11/2024 | Ninan .................. G06K 7/1417 |
| 2025/0117616 A1* | 4/2025 | Rana ................ G06K 19/06037 |

OTHER PUBLICATIONS

NPL Search Terms (Year: 2025).*

* cited by examiner

502

124

224

524

520

510

509

508

504

512

514

516

506

520

1001 — CONDUCT QUERY WITH RESPECT TO MULTIPLE USERS

1000

1002 — COLLECT TRAINING DATA

1003 — TRAIN PREDICTIVE MODEL

1004 — PREDICT DATA PRIVACY AND/OR DATA PORTABILITY MEASURES

1005 — PERFORM TASK WITH RESPECT TO USER

1006 — QUERY USER REGARDING PREDICTED DATA PRIVACY AND/OR DATA PORTABILITY MEASURES

FEEDBACK DATA UTILIZED IN MODEL TRAINING

1007

Auto loans

You can choose your car. Why not your loan?
Buying or refinancing, we'll make your decisions easier.

⊘ $3500 minimum borrowing credit

⊘ Up to 84-month terms available

⊘ Variable rates as low as 5.82% APR[1]

Learn more

Name: John Doe

DOB-01/01/XXXX

SSN - 123-XX-XXXX

Address: 123 ABC Road, DEF, GA 30303

Here is the information we have found in our system

You have a choice to view this information easily using secured QR code below

DATA PRIVACY USING QUICK RESPONSE CODE

FIELD

The invention relates generally to data privacy, and more particularly to a data privacy management system and method that improves data portability using quick response code.

BACKGROUND

Data privacy, or information privacy, often refers to a specific kind of privacy linked to personal information that is provided from individuals to private enterprises in a variety of different applications. Currently, protections for personal information are sector-specific, including personal health information, educational information, children's information, and financial information, and each has different enforcement mechanisms and unique requirements on consent and disclosure. However, data privacy is ever-evolving in how personal information is used and how it is regulated. The future of data privacy will likely require greater protections and more affirmative rights for individuals.

It is known for private enterprises to provide individuals with certain protections related to their personal information. For example, the protections may include permitting the individual to set privacy preferences and/or make personal data requests related to their personal information via customer service channels. One inherent shortcoming of the use of such customer service channels is related to the time and effort required for the completion thereof. Such customer service channels may also be considered intrusive with respect to requesting certain impressions of the respondent with respect to personal or private data. The establishment of privacy preferences and personal data requests by individuals are also often optional in most circumstances where such privacy preferences and personal data requests are offered. Each of these factors may result in a low participation rate for setting the privacy preferences and/or initiating personal data request by the individual.

Data portability is necessary to address the privacy preferences and personal data requests of individuals. Generally, data portability ensures that individual can easily obtain, move, copy, transfer, and reuse their personal information across different services, platforms, and environments. It is usually required that data be provided in a commonly use, machine-readable format.

It is therefore desirable to develop a data privacy management system and method configured to provide enhanced data privacy protection while improving data portability.

BRIEF SUMMARY

In concordance and agreement with the present invention, a data privacy management system and method configured to provide enhanced data privacy protection while improving data portability, have been newly designed.

In one embodiment, A system for displaying a data privacy dashboard, comprises: a computing system including at least one processor and at least one memory device including computer-readable instructions, wherein the at least one processor is in communication with at least one user device via a network connection; wherein the at least one processor is configured to: display the data privacy dashboard on the at least one user device, where the data privacy dashboard includes at least one of data privacy measures and a personal data request feature; receive from the least one user device at least one communication request related the at least one of the data privacy measures and the personal data request feature; collect privacy data based per the at least one communication request related the at least one of the data privacy measures and the personal data request feature; generate at least one quick response code embedded with at least one of the privacy data and a link to the privacy data based upon the at least one communication request; and transmit the at least one quick response code embedded with at least one of the privacy data and the link to the privacy data the at least one user device; and display the at least one quick response code on the at least one user device.

In another embodiment, a system for displaying a data privacy dashboard, comprises: a computing system including at least one processor and at least one memory device including computer-readable instructions, wherein the at least one processor is in communication with at least one user device via a network connection; wherein the at least one processor is configured to: display the data privacy dashboard on the at least one user device, where the data privacy dashboard includes at least one of data privacy measures and a personal data request feature; collect privacy data based related the at least one of the data privacy measures and the personal data request feature; generate a predictive model during training of a machine learning program including a neural network of the machine learning program, wherein a training data set utilized during the training of the machine learning program comprises a personal data set of at least one user; predict, by the predictive model, at least one predicted data portability measure of the at least one user associated with the at least one user device based upon the personal data set of the at least one user; generate a quick response code embedded with at least one of the privacy data and a link to the privacy data based upon the at least one predicted data portability measure; and transmit the at least one quick response code embedded with at least one of the privacy data and the link to the privacy data the at least one user device.

In yet another embodiment, a method for providing a data privacy dashboard, comprises: providing a computing system including at least one processor and at least one memory device including computer-readable instructions, wherein the at least one processor is in communication with at least one user device via a network connection; displaying the data privacy dashboard on the at least one user device, where the data privacy dashboard includes at least one of data privacy measures and a personal data request feature; receiving from the least one user device at least one communication request related the at least one of the data privacy measures and the personal data request feature; collecting privacy data based per the at least one communication request related the at least one of the data privacy measures and the personal data request feature; generating at least one quick response code embedded with at least one of the privacy data and a link to the privacy data based upon the at least one communication request; and transmitting the at least one quick response code embedded with at least one of the privacy data and the link to the privacy data the at least one user device; and displaying the at least one quick response code on the at least one user device.

As aspects of some embodiments, the at least one processor is configured to receive identification of the user via an application accessible by the at least one user device.

As aspects of some embodiments, the at least one processor is configured to verify identification of the user of an application accessible by the at least one user device.

As aspects of some embodiments, the at least one processor is configured to filter the privacy data prior to transmission to the at least one user device.

As aspects of some embodiments, the at least one processor is configured to filter the privacy data prior to generating the at least one quick response code.

As aspects of some embodiments, the at least one processor is configured to display the at least one communication request on a graphical user interface of the at least one user device.

As aspects of some embodiments, the at least one processor is configured to host the at least one quick response code embedded with the usage data on an application accessible by the at least one user device.

As aspects of some embodiments, the at least one processor is configured to display the at least one quick response code on a graphical user interface of the at least one user device.

As aspects of some embodiments, the at least one processor is configured to translate the at least one quick response code into human-readable data upon tactile engagement of the at least one quick response code displayed on a graphical user interface of the at least one user device.

As aspects of some embodiments, the at least one processor is configured to display the human-readable data on the graphical user interface of the at least one user device.

As aspects of some embodiments, the at least one processor is configured to require authentication to access and/or view the embedded data.

As aspects of some embodiments, the authentication has multiple levels of authentication.

As aspects of some embodiments, the authentication includes at least one of a username, a password, a pin, biometric information, and a security token.

As aspects of some embodiments, the authentication is inputted into a graphical user interface of the at least one user device.

As aspects of some embodiments, the at least one quick response code includes at least one an identifier of the enterprise system.

As aspects of some embodiments, the source of the privacy data is the enterprise system.

As aspects of some embodiments, the source of the privacy data is a third-party entity.

As aspects of some embodiments, the at least one quick response code is accessible to the user via the privacy dashboard.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

The above-mentioned, and other features and objects of the inventions, and the manner of attaining them will become more apparent and the invention itself will be better understood by reference to the following description of embodiments of the invention taken in conjunction with the accompanying drawings, wherein.

DETAILED DESCRIPTION

Figure 1:
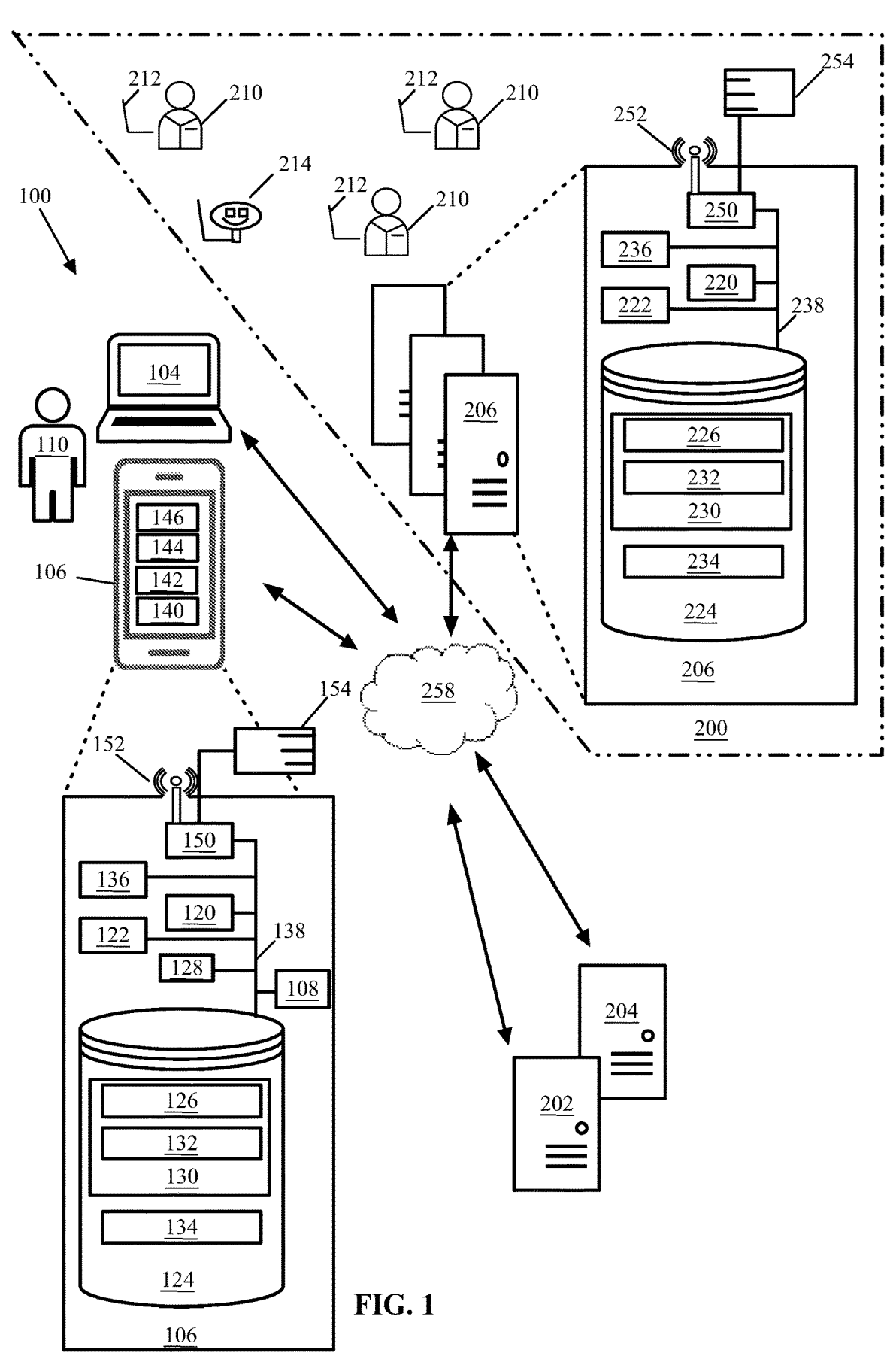
FIG. 1 is a schematic diagram illustrating an enterprise system and environment thereof for implementing a data privacy management system and method in accordance with an embodiment of the presently described subject matter.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which a data privacy application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third-party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DB-SCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figures 2A, 2B, 2C:
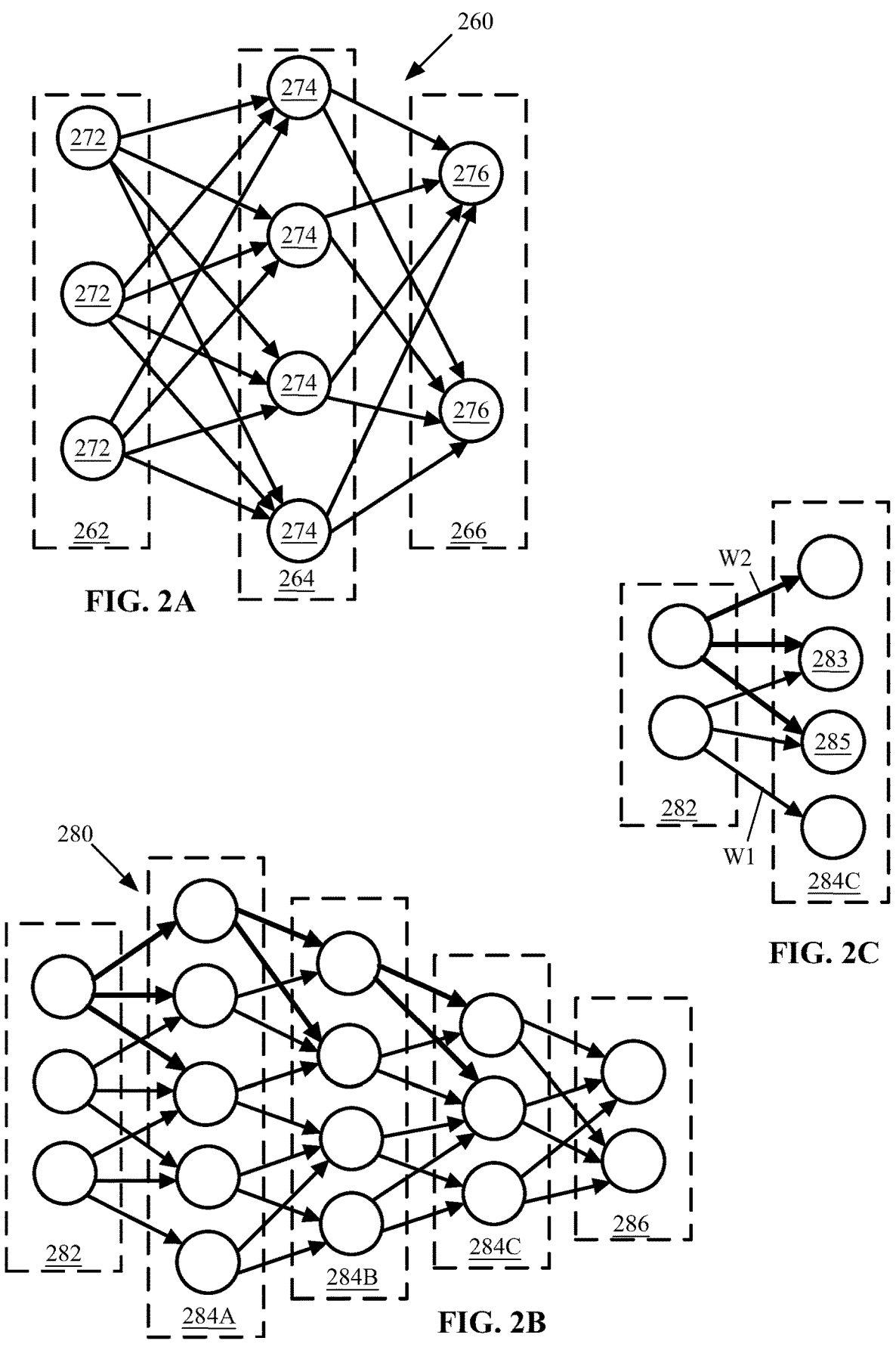
FIG. 2A is a diagram of a feedforward network, according to at least one embodiment, utilized in machine learning.
FIG. 2B is a diagram of a convolution neural network, according to at least one embodiment, utilized in machine learning.
FIG. 2C is a diagram of a portion of the convolution neural network of FIG. 2B, according to at least one embodiment, illustrating assigned weights at connections or neurons.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
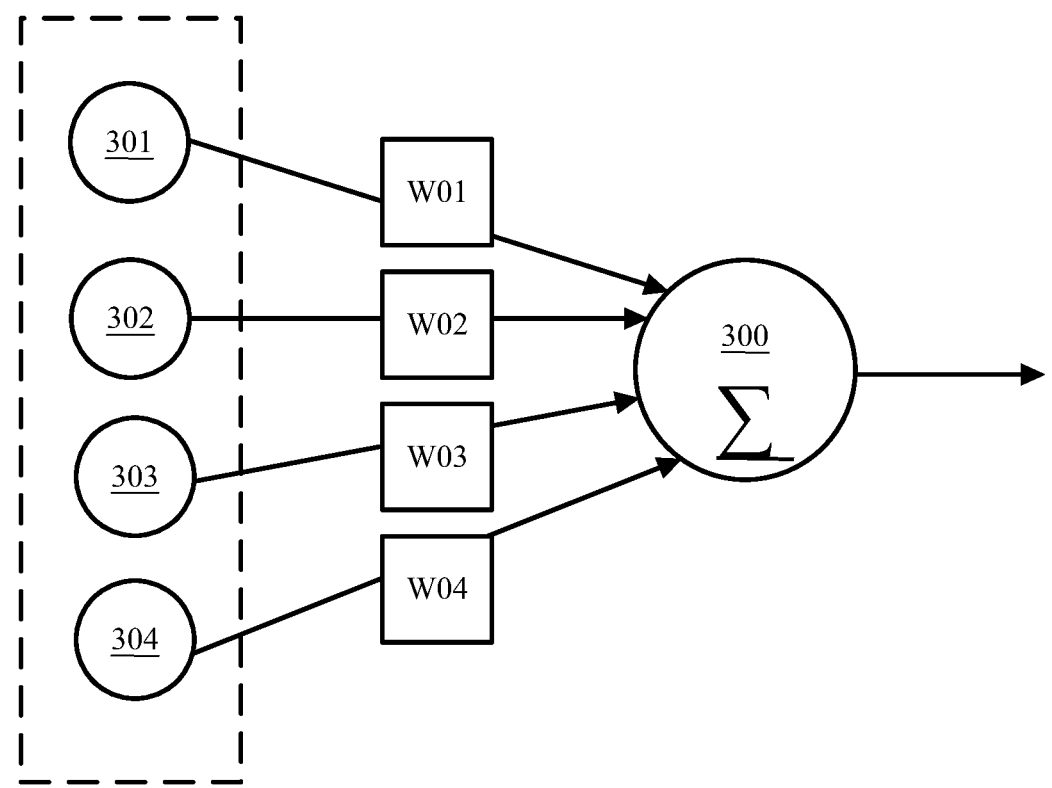
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
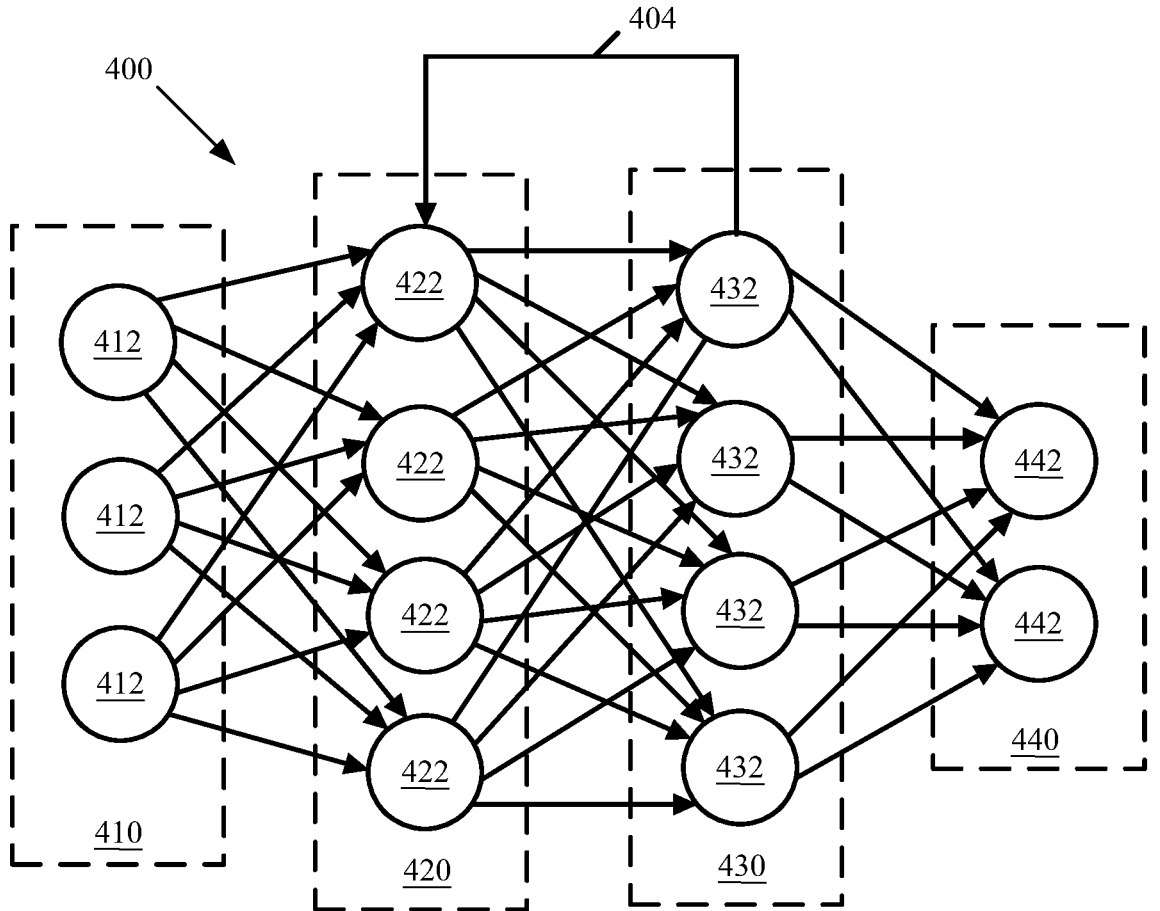
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
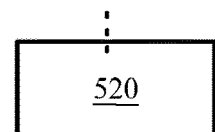
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 124, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
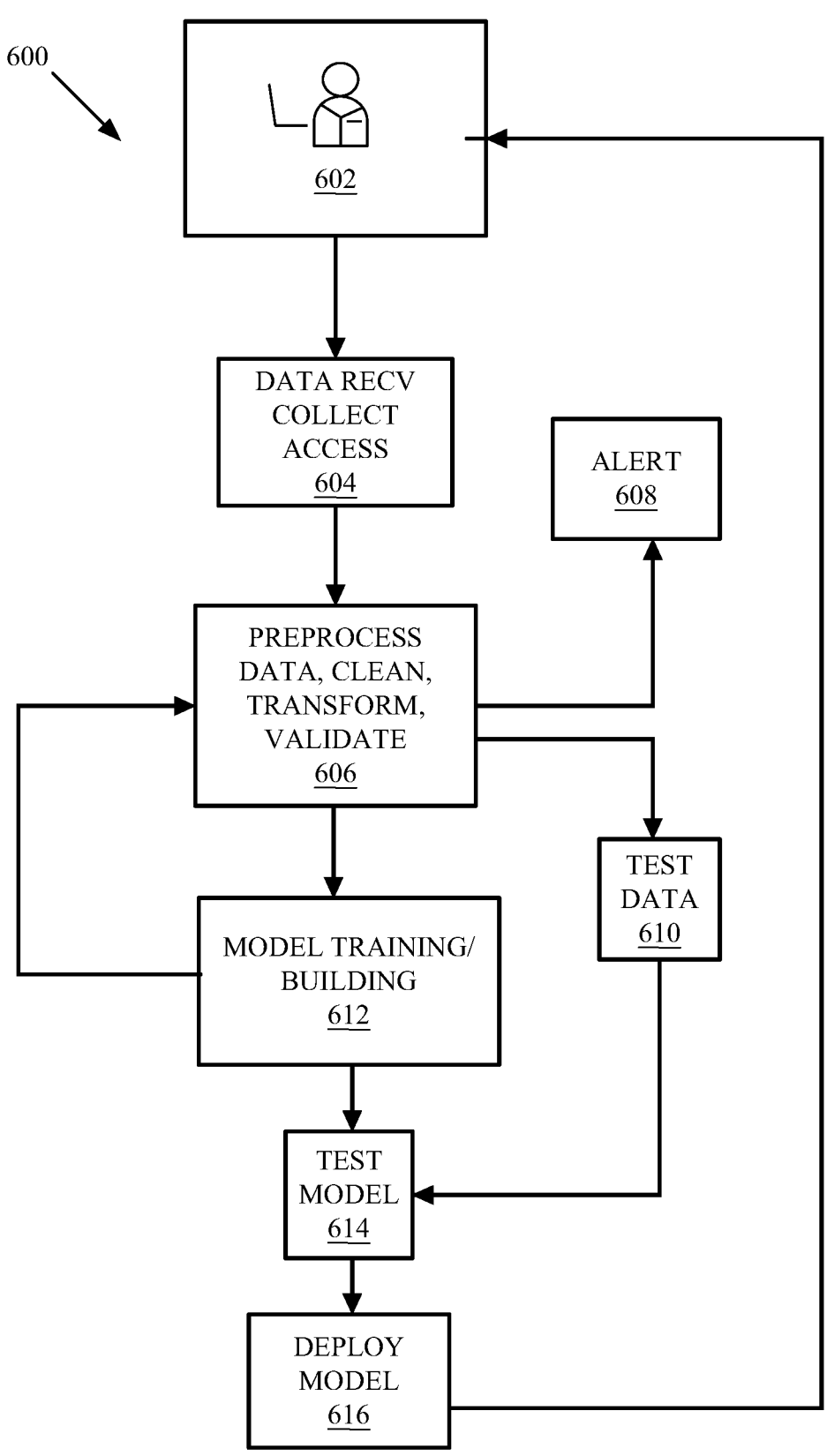
FIG. 6 is a flow diagram illustrating a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

The present invention relates to data privacy management and improving data portability. Data portability is the ability to move data among different applications, programs, computing environments or could services. It is becoming more important as greater quantities of information and personal data is stored in the cloud and/or by the enterprise system 200. For the user 110, data portability allows for coordination and management of the personal data being shared with and used by the enterprise system 200. More and more users 110 are using the mobile device 106 for data privacy management and data portability because of ease of use and instant access.

In accordance with the present disclosure, the data privacy management and data portability are enhanced and improved by using one or more quick response (QR) codes. The QR code is a two-dimensional matrix barcode that stores information horizontally and vertically in a series of modules arranged in a pattern. Each module in the pattern represents a bit of embedded data, which can be decoded by tactile engagement (e.g., touch) and/or scanning with a QR scanner or imaging device (e.g. a camera). The tactile engagement of the QR code may be particularly suitable for use on the mobile device 106 and/or the computing device 104 having a touch screen or touch graphical user interface. When touched and/or scanned, the unique pattern on the barcode translates into human-readable data, such as text or images, which are displayed on the graphical user interface of the computing device 104 and mobile device 106 of the user 110. The QR code may require authentication to access and/or view the embedded data on the graphical user interface of the computing device 104 and mobile device 106 of the user 110. In some embodiments, the QR code may require multiple levels of authentication such as a username, a password, a pin, biometric information, and a security token, for example, or have an expiration time limit. The authentication may be inputted into the graphical user interface of the computing device 104 and mobile device 106 of the user 110. In other embodiments, the tactile engagement of the QR code may eliminate the need for multiple levels of authentication to decode the embedded data. In some instances, the QR code will include one or more identifiers (e.g., a brand and/or logo and/or associated color) of the enterprise system 200 as an added layer of authenticity and distinctiveness. It is understood that the various QR codes described in the present disclosure may be collectively referred to as "QR code".

Figure 10:
FIG. 10 is a graphical illustrations showing a quick response (QR) code used by the enterprise system.
Figure 10:

In addition to embedded personal data, the QR code may provide a means to distribute information and expand product and/or service offerings across the digital/retail footprint. For example, the QR code may be used in marketing or various other materials to provide general information to users 110 or agents 210 of the enterprise system 200, including but not limited to brochures at retail locations to guide users 110, weekly activity highlights/newletters to make information readily available to the agents 210 of the enterprise system 200, product and/or service offerings (see FIG. 10), knowledge articles at ATMs, video advertisements, podcast, and the like. In some embodiments, the QR code providing a means to distribute information and expand product and/or service offerings is displayed or accessed via the graphical user interface of the computing device 104 and mobile device 106 of the user 110.

The present disclosure further relates to the creation of a predictive model for predicting the embedded data in the QR code and various other data privacy and/or data portability measures based on the training of a machine learning program. The machine learning program of the present invention is described hereinafter as utilizing the data sets associated with at least one of the users 110 of the enterprise system 200.

As mentioned hereinabove, each of the users 110 may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and each of the users 110 may include one or more of the users 110 having an account with the enterprise system 200 wherein certain interactions between the enterprise system 200 and each of the users 110 may be monitored and recorded by the computing system 206, as described in greater detail herein.

The present invention refers to the use of personal data in executing the corresponding machine learning program. Such personal data may refer to data regarding the responses of one of the users 110 of the enterprise system 200 to one or more corresponding queries, or may collectively refer to the data of a plurality of the users 110 having completed the queries. The user 110 may be alternatively referred to as a respondent of the query when discussing the query process hereinafter. Additionally, as used herein, a query may be any set or sets of queries answered by a respondent for the purpose of collecting data regarding the opinions, feelings, thoughts, beliefs, impressions, predictions, and/or observations of the respondent. The personal data may be accumulated using any known method so long as the personal data is recorded in a form configured for use with the computing system 206 and the corresponding machine learning program executed thereon. In some embodiments, the query may be conducted online via the web browser or software application 132 corresponding to the enterprise system 200 as operating on the user devices, referring to either or both of the computing device 104 and mobile device 106 of the respondent, as desired.

The machine learning program utilizes personal data regarding each of the users 110. As used herein, the personal data of each respective user 110 refers to any data specific to that user 110. The personal data set of each of the users 110 may include the query data set corresponding to that user 110 as a subset of the personal data set thereof, and may include entries relating to each individual data privacy measure resulting from the completion of the query. The personal data of each of the users 110 of the enterprise system 200 may be in the form of the data 234 stored to the storage device 224 of the computing system 206 at utilized for carrying out the functions of the machine learning program as described herein. The data 234 may originate from various different sources including the responses of the user 110 to queries from the enterprise system 200, the recorded interactions of the user 110 with the enterprise system 200, or one or more third-party and external sources or systems, which may once again be representative of the previously disclosed external systems 202, 204.

The present invention relies upon the enterprise system 200 having access to the personal data associated with each associated user 110 in order to train the machine learning program and subsequently utilize the predictive model generated thereby. In some embodiments, the invention may be carried out with respect to a user 110 having an established account with the enterprise system 200, wherein the establishment of an account may include the user 110 providing at least some of the associated personal data to the enterprise system 200. The enterprise system 200 may collect data regarding the user 110 by directly querying and recording the responses of the user 110. Such data may be entered via use of the web browser application or software application 132 associated with the enterprise system 200, and such information may be entered by the user 110 via use of the user devices, referring to either or both of the computing device 104 and mobile device 106 executing the application 132. The data provided to the enterprise system 200 regarding the user 110 may include, as non-limiting examples, the gender, age, ethnicity, income level, employment status, home ownership status, marital status, citizenship status, etc. of the corresponding user 110. Any available demographic data regarding the user 110 may form a portion of the personal data utilized by the machine learning program with respect the user 110.

The personal data may include sensitive data and domain specific data. Herein, the personal data may refer to data that may be utilized for determining identity of the user 110. Examples of the personal data in case of the data privacy application 232 may include permanent account numbers, date of birth, e-mail address, residential address, and mobile numbers, for example. The personal data may also include data that can pose a risk or affect the user 110 financially or otherwise, if disclosed in public. In an embodiment, the personal data may include domain specific fields, and can be generated by the enterprise system 200.

If the enterprise system 200 is representative of a financial institution or mobile banking system, the personal data accessible to the enterprise system 200 regarding the user 100 may include data regarding products and/or services offered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user devices, referring to either or both of the computing device 104 and mobile device 106 of the user 110.

In some circumstances, such as when the enterprise system 200 is representative of a financial institution or mobile banking system offering typical banking services and products, the enterprise system 200 may have access to data regarding the transactions of the user 110 as facilitated by the enterprise system 200. For example, transaction histories regarding purchases carried out via a credit card or debit card associated with the enterprise system 200 may be accessible to the enterprise system 200, as well as current or prior account balances.

The enterprise system 200 may also be configured to monitor and record specific interactions of the user 110 with the enterprise system 200 in attaining additional data regarding the user 110 that may be utilized by the machine learning program disclosed herein. For example, in the event that the user 110 has an account with the enterprise system 200, the user 110 may be required to provide authentication data to the web browser application or software application 132 associated with the enterprise system 200. Following such a login process, the enterprise system 200 may monitor and record the interactions of the identified user 110 with the interface of the corresponding application 132 in order to accumulate data associated with the user 110. For example, the enterprise system 200 may monitor data such as the number of logins to the account of the user 110 in a specified period of time, the frequency of the logins of the user 110, the duration of time the user 110 remains logged into the application 132 (while remaining active), and the types of products and/or services interacted with and/or purchased by the user 110 via navigation of the corresponding application 132. Data may also be recorded regarding the navigation of the application 132, such as recording which resources the user 110 has accessed, how long such resources were accessed, or the like, such as referencing which web addresses associated with the application 132 have been accessed by the user 110 or which files related to the application 132 have been accessed by the user 110.

The personal data regarding the user 110 may also include data relating to the account settings of the user 110 as established with respect to the computing system 206. Such account setting data may be stored to the storage device 224 of the computing system 206 and may be associated with determining how the computing system 206 interacts with the user 110 via the corresponding user devices, referring to either or both of the computing device 104 and mobile device 106. For example, such account setting data may include data relating to data privacy preferences of the user 110, personal data requests from the user 110, the frequency of communications sent from the computing system 206 to the user 110 for access via the user devices, referring to either or both of the computing device 104 and mobile device 106, under what conditions to communicate with the user 110, the content of such communications, or the types or forms of such communications. The change in the account setting may also correspond to a change in the manner in which the user 110 interacts with the computing system 206 via the user devices, referring to either or both of the computing device 104 and mobile device 106, such as changing the manner in which the interface of the web browser application or software application 132 displays information to the user 110 or the information or resources accessible to the user 110 via navigation of the web browser application or software application 132, as non-limiting examples.

In other circumstances, the personal data may be representative of data acquired regarding the user 110 during web related activities, such as tracking a web browsing history of the user 110, as may be provided by "cookies" or similar tools, or tracking certain communications of the user 110, such as monitoring certain aspects of the email activity of the user 110. If web related activities are monitored, such data may correspond to the activities of the user 110 with respect to the webpage or software application 132 associated with the enterprise system 200 or may relate to the activities of the user 110 with respect to third-party applications or websites. Such data may be communicated from a corresponding user devices, referring to either or both of the computing device 104 and mobile device 106 used to perform the web browsing to the computing system 206 for storage to the storage device 224 as a form of the data 234.

The enterprise system 200 may also utilize data originating from one of the external systems 202, 204, which may be representative of personal data accumulated with respect to the user 110 external to the enterprise system 200 that is available to or otherwise accessible by the computing system 206 via interaction with one or more of the external systems 202, 204. The external systems 202, 204 may accordingly be representative of third-party data providers configured to communicate data to the computing system 206 regarding the user 110. Such data may include a credit history of the user 110, transactions of the user 110 with respect to other business entities, a criminal history of the user 110, etc., as may originate from sources others than the enterprise system 200. Further examples include data originating from third-party social networks or the like, such as check-ins at certain establishments, social connections to other users, posting or commenting histories, or interactions with certain other users or business entities. Data regarding a transaction history of the user 110, whether derived from the relationship between the user 110 and the enterprise system 200 or the user 110 and a third-party external system 202, 204, may include data regarding the establishments at which the user 110 has made the purchases, the amounts of such purchases, and potentially additional information regarding the products and/or services related to such purchases. Such data may be available via records of the credit or debit purchases made by the user with respect to certain establishments as monitored by the third-party external system 202, 204.

The personal data collected with respect to each user 110 may be categorized as demographic data regarding the user 110, behavioral data regarding the activities of the user 110, or behavioral data regarding the activities of the enterprise system 200 with respect to the user 110 (such as data relating to communications from the enterprise system 200 to the user 110 regarding educational materials or data relating to offers for the purchase of products and/or services). The demographic data generally refers to the data regarding the user 110 that corresponds to a trait or characteristic of the user 110 by which the user 110 may be categorized or classified, whereas the behavioral data generally refers to data regarding the recordation of information regarding the actions of the user 110, the actions of the enterprise system 200, or past interactions or transactions occurring between the enterprise system 200 and the user 110.

A personal data set associated with any individual user 110 may include entries of any the different types of data disclosed hereinabove, including entries relating to demographic data or behavioral data. Each entry of the personal data set may be representative of one of the demographic traits of the user 110 or one of the behavioral traits of the user 110. The number or types of entries available in each personal data set may vary among users 110 depending on the relationship to the enterprise system 200 and the availability of such data.

The data set comprising the personal data sets of each of the plurality of the users 110 of the enterprise system 200 may collectively be referred to as the training data set associated with the machine learning program. The training data set may be organized based on the methodology of the machine learning program utilized in finding relationships between the personal data and data privacy and/or data portability measures.

In one embodiment of the present invention, the machine learning program is configured to perform unsupervised learning where the training data set formed by the personal data of the users 110 is unlabeled with respect to all entries. As such, neither the query data nor the remaining personal data is representative of a form of known output data during the process of training the machine learning program. Each of the different data entries regarding a specific user 110, whether query data entries or otherwise personal data entries associated with the user 110, may therefore form an independent unlabeled input for performing the unsupervised learning of the machine learning program.

The personal data entries associated with each user 110 and included in the corresponding personal data set may include any combination of the classifications or categorizations of the personal data described hereinabove while remaining within the scope of the present invention. For example, in some circumstances, the training data may include the demographic personal data of one or more of the users 110. In other circumstances, the training data may include the behavioral data regarding the activities of one or more of the users 110. In other circumstances, the training data may include the behavioral data regarding the activities of the enterprise system 200 with regards to one or more of the users 110. In other circumstances, the training data includes a combination of the listed types of data, such as demographic data and one or both of the identified forms of behavioral data regarding one or more of the users 110.

As used hereinafter, all personal data of each user 110 that is utilized in training the machine learning program or performing a prediction via the predictive model generated by the machine learning program may alternatively be referred to as the personal data profile of the corresponding user 110 at the time at which such data is utilized by the machine learning program. For example, one specific user 110 may include a personal data profile including a combination of query data, demographic data regarding the specific user 110 (age, income, marital status, etc.), and data regarding recorded interactions the specific user 110 has engaged in with the enterprise system 200 (account transaction history, application browsing history, etc.). The personal data profile of the user 110 accordingly is different each time the personal data regarding the user 110 as utilized by the machine learning program changes, such as when certain entries indicate a change in value or a change in state or condition with respect to the personal data set of the user 110.

The machine learning program may be configured to perform cluster analysis wherein the training data constituting the personal data is grouped into subsets (clusters) wherein each cluster is determined by the similarity of the data contained within the cluster with respect to a plurality of the users 110, or the dissimilarity with respect to data not within the cluster with respect to the plurality of the users 110, depending on the methodology utilized. That is, each cluster includes a plurality of the users 110 identified as forming the cluster having met a threshold degree of similarity among the data corresponding to the plurality of the users 110 according to a predefined similarity criteria. This clustering allows for users 110 having a similarity of personal data profile, such as a certain set of demographic traits and behavioral traits based on the corresponding data, to be grouped together along with certain data privacy and/or data portability measures typical of this cluster of the users 110. For example, a cluster of users 110 corresponding to a certain personal data profile (or aspects thereof) may also correspond to those same users 110 having a common or similar data privacy and/or data portability measures, or alternatively this cluster may include each of the users 110 having a common or similar data privacy measure. The unsupervised learning process accordingly allows causality to be implied between a particular personal data profile and a particular result by discovering a correlation between such common occurrences of these data within the training data.

The machine learning program may be considered to be a form of classification algorithm based on the ability of the machine learning program to identify classifications of the users 110 associated with the training data set based on the clusters of the users 110 discovered within the training data. The machine learning program may utilize a hidden Markov model in modeling the training data set and forming the predictive model of the machine learning program. The machine learning program may also utilize non-negative matric factorization in performing the above described clustering analysis.

The machine learning program may be configured to determine a probability that a certain personal data profile will correspond to a certain data privacy and/or data portability measures. The machine learning program may utilize various forms of fuzzy logic to represent the probability of any given result occurring in the query data when performing the calculations relating to such predictions.

The unsupervised training of the machine learning program includes repeatedly adding new data to the training data set regarding new and additional users 110 with data privacy and/or data portability measures, for example, having added data privacy preferences and/or made personal data requests to the enterprise system 200 or externally with one or more third-party entities. As more data regarding more users 110 are added to the training data set, additional relationships may be discovered within the structure of the data or refinements may be made with respect to already discovered relationships, thereby improving the predictive capabilities of the machine learning program. The training of the machine learning program results in the generation of a predictive model wherein the machine learning program is configured to predict the data privacy and/or data portability measures expected to be associated with a personal data profile of a specific user 110.

The machine learning program may be configured to make predictions (determinations) regarding the data privacy and/or data portability measures when the determined probability of data privacy and/or data portability measures occurring as predicted by the predictive model exceeds a threshold value of probability. For example, the machine learning program may only make a definitive determination with respect to data privacy and/or data portability measures when the probability of the prediction being correct exceeds 50%. The machine learning program may alternatively be configured to make predictions regarding the data privacy and/or data portability measures when the determined probability for a certain result exceeds the probability of all other possible results with respect to the given data privacy and/or data portability measures. For example, where data privacy and/or data portability measures are concerned, the selection showing the greatest probability of being correctly predicted may be utilized as the prediction of the predictive model, even where this event is not more likely than not to occur.

Once the machine learning program has been trained to a degree considered suitable for predicting the data privacy and/or data portability measures associated with the personal data, the machine learning program may be configured to compute and communicate data regarding the predictions of the machine learning program in view of a specific personal data profile, which corresponds to the personal data profile of a specific user 110 of the enterprise system 200. Such a prediction occurs in the absence of an action regarding the data privacy and/or data portability measures by the specific user 110. Instead, the machine learning program utilizes only the personal data profile of the corresponding user 110 for determining a correlation with an expected data privacy and/or data portability measures. The machine learning program is accordingly able to predict (to some degree of probability) the expected data privacy and/or data portability measures via the exclusive use of the personal data profile of the user 110 when executing the predictive capabilities of the machine learning program.

The data derived from the predictions of the machine learning program are hereinafter referred to as prediction data, and may refer to the data regarding the predictions of the data privacy and/or data portability measures of a user 110 to the enterprise system 200 and/or one or more third-party entities. Such prediction data may be stored as the data 234 of the computing system 206 for use by the enterprise system 200 in making further determinations regarding the user 110 as described hereinafter.

The predictive model of the machine learning program may be configured to predict the data privacy and/or data portability measures with respect to a corresponding user 110. Assuming that the methodology of the algorithm is known by the computing system 206 regarding the generation of data privacy and/or data portability measures, the determination of actual data privacy and/or data portability measures of the user 110 may accordingly be determined by predicting the data privacy and/or data portability measures of the user 110 to each individual data privacy and/or data portability measures used in determining such data privacy and/or data portability measures according to the corresponding algorithm. Each such predicted data privacy and/or data portability measures may be assigned a numeric score or may be determined to trigger a condition of the algorithm logic in accordance with the same known methodology utilized within the algorithm.

By assigning the same values and/or rules to the predicted data privacy and/or data portability measures as those applied to the actual data privacy and/or data portability measures of the user 110, the enterprise system 200 can utilize the same methodology via the corresponding algorithm in computing a numeric score associated with the corresponding subset of the personal data. That is, the use of the same methodology in computing the score based on the predicted data privacy and/or data portability measures as the methodology used in computing the score based on the actual data privacy and/or data portability measures of the user 110 results in the same score being generated with respect to either process when the machine learning program correctly predicts the data privacy and/or data portability measures of the user 110. The calculation of such a score may include the use of the prediction data generated by the machine learning program with respect to a specific user 110 as the input data for use in the algorithm, which may be stored as instructions 226 within the storage device 224 of the computing system 206, and which may be executed by the processor 220 thereof. The resulting score and data privacy and/or data portability measures may then be stored as a form of the data 234.

In alternative embodiments, the machine learning program may instead associate the personal data profile of each of the users 110 directly to the data privacy and/or data portability measures determined by the algorithm in the absence of an independent determination of the data privacy and/or data portability measures by the computing system 206 based on the input to the algorithm. The prediction of individual data privacy and/or data portability measures is thus not required for then computing such data privacy and/or data portability measures. Instead, the data privacy and/or data portability measures may be predicted via a correlation between the personal data profile of the instantaneous user 110 and the personal data profiles associated with such data privacy and/or data portability measures as determined during the unsupervised training of the machine learning program described above. In other words, the personal data profile of the user 110 may be determined to belong to a cluster of data regarding users 110 having specific data privacy and/or data portability measures, hence the data privacy and/or data portability measures would be predicted to be the data privacy and/or data portability measures of the corresponding user 110 absent analysis of data regarding individual data privacy and/or data portability measures. The actual data privacy and/or data portability measures may then be initiated based upon the predicted data privacy and/or data portability measures of the corresponding user 110.

Figure 7:
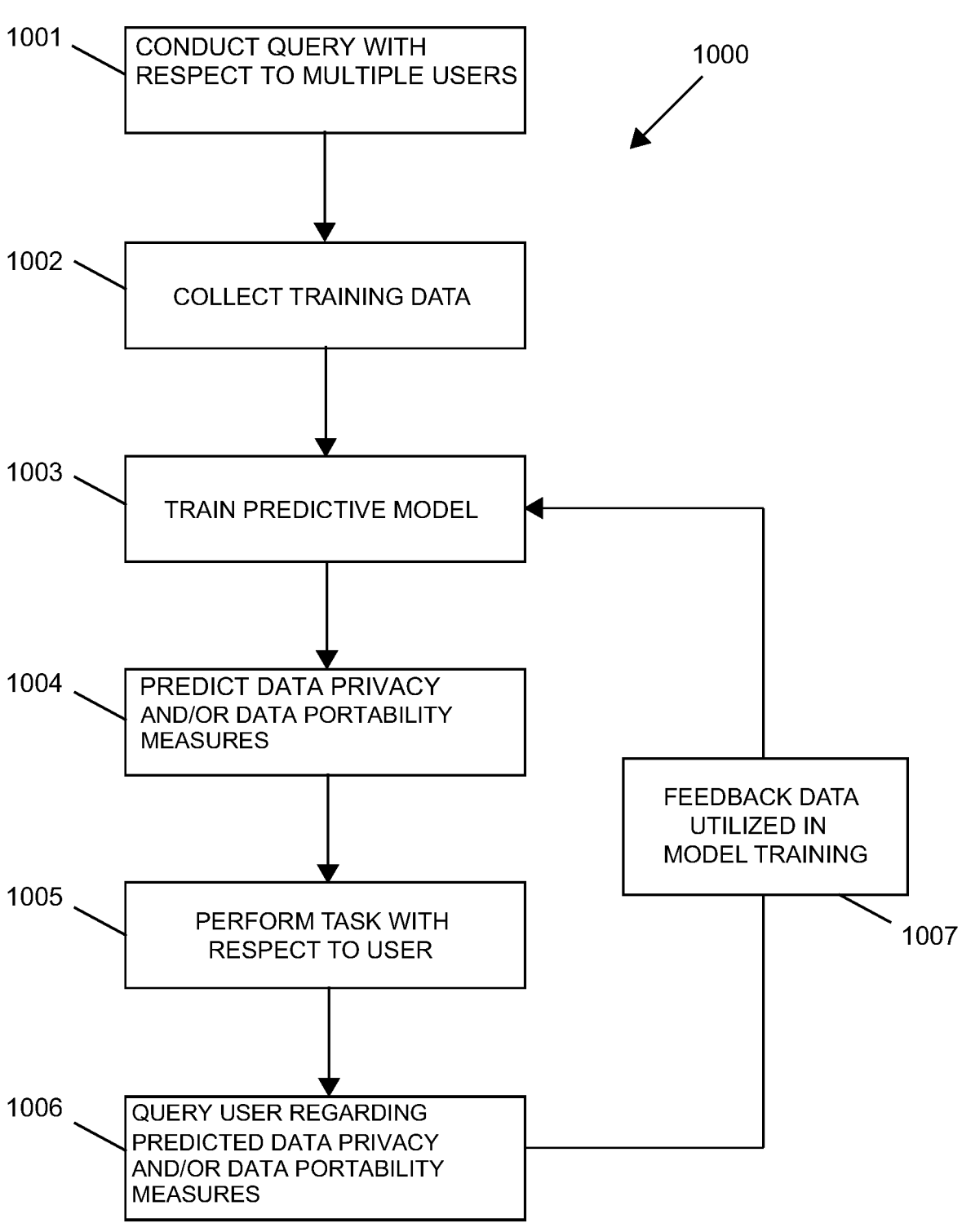
FIG. 7 is a flow diagram illustrating a method, according to at least one embodiment, of predicting data privacy and/or data portability measures related to user based upon personal data of the user.

FIG. 7 illustrates a method 1000 of implementing the machine learning program for predicting the data privacy and/or data portability measures with respect to a user 110 of the enterprise system 200 based on the personal data profile of the user 110 according to the present invention. The method includes an initial step 1001 of conducting the queries with respect to a plurality of the users 110 to establish the personal data utilized in the training data set. As mentioned above, the queries may be conducted directly by the enterprise system 200 or by a third-party external source 202, 204, and may be initiated at the request of the user 110, the enterprise system 200, or the third-party external source 202, 204.

In some embodiments, the enterprise system 200 requests the completion of the query by a user 110 when the user 110 first establishes a relationship with the enterprise system 200, such as when the user 110 first establishes an account with the enterprise system 200. The use of data related to new users 110 of the enterprise system 200 aids in establishing a benchmark for monitoring the progress of these new users 110 as they continue to have a relationship with the enterprise system 200. In other embodiments, the enterprise system 200 allows for users 110 already having an established relationship with the enterprise system 200 to complete the query. The use of data of existing customers or clients of the enterprise system 200 allows the training data set to include data regarding the past behaviors of either of the user 110 or the enterprise system 200, or the interactions therebetween, as outlined hereinabove when describing the possible forms of personal data that may be utilized by the machine learning program. In other embodiments, the training data set includes the data of both new and existing customers or clients of the enterprise system 200, with the personal data set of the different users 110 varying in scope.

A step 1002 includes the collection of the training data required for performing the training of the machine learning program as described hereinabove. The collection of the training data includes the collection of the personal data including the corresponding personal data regarding each user 110 having completed the query. As described hereinabove, such data may originate from any of the described sources 110, 200, 202, 204 and may be communicated to the computing system 206 of the enterprise system 200 using any of the methods or communication channels described hereinabove. Certain proprietary data are also collected directly by the enterprise system 200 as a result of the monitoring of the interactions of the enterprise system 200 and the user 110 as described hereinabove.

A step 1003 includes training the machine learning program utilizing the applicable training data to generate a predictive model having the capabilities described hereinabove. The predictive model may be acquired utilizing any of the machine learning processes described herein without necessarily departing from the scope of the present invention. In the present example, it is assumed that the training of the machine learning program at step 1003 includes the use of unsupervised learning with the personal data and the query data forming the training data being considered to be unlabeled, which aids in discovering counterintuitive or unexpected relationships between the personal data and the query data.

A step 1004 includes predicting the data privacy and/or data portability measures with respect to an individual user 110 using the predictive model of the machine learning program as based on the personal data profile of the user 110 at the time of the prediction. The predicting step includes the machine learning program correlating the data profile of the individual user 110 to each of the prescribed elements of the query data, such as the responses to individual queries. The predicting step results in the generation of the prediction data regarding the individual user 110, which may be stored to the storage device 224 of the computing system 206 as a form of the data 234.

A step 1005 includes the computing system 206 of the enterprise system 200 optionally causing an action to take place in reaction to the generation of the prediction data with respect to the user 110. Such actions may relate to a communication being sent to the corresponding user 110 or a change in the behavior of the computing system 206 to reflect the contents of the prediction data. These tasks are elaborated on in greater detail hereinafter.

The machine learning program has been described thus far as utilizing unsupervised learning, but the machine learning program may also be configured to utilize semi-supervised learning in an attempt to create a feedback mechanism for testing the validity of the predictions made by the machine learning program with respect to a specific user 110, and to thereby refine the predictive model of the machine learning program. Specifically, following the above described step 1004 of predicting the data privacy and/or data portability measures with respect to a specific user 110, such prediction data may be evaluated for accuracy by performing a step 1006 of querying the specific user 110 for which the predictions were made regarding the agreement or disagreement of the specific user 110 with the predictions made by the predictive model.

The querying of the specific user 110 may include presenting the user 110 with a request for an impression of the user 110 mirroring that of one of the data privacy and/or data portability measures. The querying of the specific user 110 may therefore include the use of language that is the same or similar to that utilized in the corresponding data privacy and/or data portability measures, or that otherwise communicates the request for the same information. For example, the prediction data generated with respect to the specific user 110 may indicate that the specific user 110 is predicted to indicate that he or she does not want to have personal data shared with affiliates of the enterprise system 200. The querying may accordingly include the enterprise system 200 initiating a request that the specific user 110 confirm or deny such data privacy preference, or initiating a request that the user 110 completes a query replicating that of the actual data privacy preferences to see how the user 110 reacts when given the same selections. The querying step 1006 may, in some circumstances, comprise the specific user 110 completing the entirety of the query to evaluate each and every aspect of the prediction data regarding the user 110, as desired. The querying step 1006 may also only occur with respect to a subset of the users 110 having completed data privacy measures (i.e., setting data privacy preferences and/or making personal data requests) and/or data portability measures (i.e., accessibility and migration of user data).

The querying step 1006 may occur via any form of communication occurring between the user devices, referring to either or both of the computing device 104 and mobile device 106 of the user 110 and the computing system 206 of the enterprise system 200. In some embodiments, the user 110 is notified of the querying request and responds to the querying request during navigation of the web browser application or software application 132 associated with the enterprise system 200. The data relating to the responses of the user 110 to such feedback queries is referred to hereinafter as the feedback data associated with the specific user 110 who has been queried. The feedback data forms a feedback data set with respect to each respondent user 110 that may be stored to the storage device 224 as a form of the data 234.

The previously mentioned semi-supervised learning may occur via the use of the feedback data as labeled output data with respect to the training data set. That is, the training data set may now include a combination of the personal data associated with users 110, the personal data associated with user 110 having completed the data privacy and/or data portability measures, the personal data associated with the users 110 who responded to a feedback related query following predictions regarding those users 110, and the feedback data associated with those users 110 who responded to the feedback related query to evaluate the prediction data. All such data may be unlabeled with the exception of the described feedback data. The semi-supervised training of the machine learning program via the introduction of the feedback data into the training data set is represented by step 1007 in FIG. 7, which schematically illustrates the manner in which the feedback data is utilized as a part of the training data set during the training step 1003. The newly trained machine learning program may include a modified predictive model, which is then able to perform the predicting step 1004 in accordance with the methodology of this modified predictive model. The generation of the modified and updated predictive model is further described with reference to the description of the method of FIG. 6, which describes such a process generally. It should also be appreciated that any of the processes described in the explanation of FIG. 6 may be utilized in training and building the predictive model as described herein.

It should be appreciated that the machine learning program may operate in the absence of the semi-supervised learning as relating to steps 1006, 1007, and may instead rely exclusively on the predictive model generated during the unsupervised learning processes described herein without necessarily departing from the scope of the present invention.

The machine learning program has been described thus far as utilizing unsupervised or semi-supervised learning, but the machine learning program may alternatively utilize supervised learning wherein the training data is labeled appropriately for establishing a causal relationship between the input training data in the form of the personal data of each user and the output training data in the form of the query data accumulated with respect to that same user 110. The supervised training process of the machine learning program may utilize any of the supervised training processes disclosed herein, including the use of a neural network having at least one hidden layer, without departing from the scope of the present invention.

A variety of different triggering conditions may be utilized by the enterprise system 200 in determining when the machine learning program should execute the predictive aspects of the machine learning program to make a determination of the prediction data with regards to a specific user 110 with respect to step 1004. In some embodiments, the prediction data may be determined with respect to a specific user 110 when such setting data privacy and/or data portability measures is requested by the user 110 or manually requested by an agent 210 of the enterprise system 200. For example, the option to have such prediction data generated by the enterprise system 200 may be offered by the enterprise system 200 via the corresponding web browser application or software application 132 associated with the enterprise system 200, wherein a selection of such a feature by the user 110 causes the computing system 206 to initiate the generation of the corresponding prediction data via the execution of the predictive modeling of the machine learning program. Alternatively, the agent 210 may offer the determination of the prediction data when the agent 210 believes that such setting data privacy and/or data portability measures may be helpful to the user 110.

In other embodiments, the prediction data may be determined at fixed intervals, or otherwise on a fixed schedule. For example, the prediction data may be determined with respect to each participating user 110 at regular intervals, such as daily, weekly, monthly, or quarterly, or may be preprogrammed to occur on specific dates as requested by the user 110 or agent 210, as non-limiting examples.

In other embodiments, the prediction data may be determined when the personal data profile of the specific user 110, as available for use in training the machine learning program and executing any predictive capabilities thereof, indicates that a triggering condition has occurred that may be indicative of the need for an assessment of the user 110, such as the occurrence of an event shown to have a strong correlation to a change in data privacy and/or data portability measures of the user 110 regarding the predictions relating to the user 110. For example, the personal data of the user 110 reflecting that the user 110 has reached a certain age may prompt the determination of the prediction data when such a change in age is demonstrated to correlate to a change in the predictive data privacy and/or data portability measures of the user 110.

Personal data specific to and accessible exclusively by the enterprise system 200 may be utilized in determining such a triggering condition. Such personal data may be acquired as a result of the relationship present between the enterprise system 200 and the user 110. For example, if the enterprise system 200 is a financial institution having access to account records, the triggering condition may relate to a certain balance being reached within one of the accounts of the user 110, or to a failure of the user 110 to make a scheduled payment on a debt managed by the enterprise system 200. Such personal data may accordingly refer specifically to interactions between the user 110 and the enterprise system 200 as a part of the relationship present between the user 110 and the enterprise system 200, including data regarding past transactions of the user 110 as initiated by the enterprise system 200 or transactions occurring directly between the user 110 and the enterprise system 200. For example, the enterprise system 200 may utilize data regarding purchases of the user 110 made with entities other than the enterprise system 200 (where such data is available, such as where a financial instrument such as a credit card or debit card associated with the enterprise system 200 is used in making these purchases) or data regarding transactions including payments, agreements, or other contractual obligations made directly between the user 110 and the enterprise system 200 with regards to a product and/or service offered by the enterprise system 200.

Such data may also include data collected by the enterprise system 200 from a third-party source where the user 110 has provided express consent for such data to be shared with or otherwise accessible to the enterprise system 200, such as data regarding transactions occurring between the user 110 and entities external to the enterprise system 200 that are not otherwise monitored directly by the enterprise system 200. For example, the enterprise system 200 may have access to data regarding transactions occurring with respect to a credit card or debit card of the user 110 associated with and/or managed by a financial institution other than the enterprise system 200, hence such data must be communicated to the enterprise system 200 for access thereto.

The enterprise system 200 may also utilize personal data collected with respect to the user 110 regarding the interactions of the user 110 with the enterprise system 200 via the corresponding web browser application or software application 132 associated with the enterprise system 200. For example, the navigating of the application 132 may include the user 110 reviewing information relating to certain products and/or services offered by the enterprise system 200, or making a selection that additional information is requested with respect to a topic related to one of the data privacy and/or data portability measures corresponding to the prediction data. Similar data may be collected regarding alternative interactions, such as whether or not the specific user 110 views or responds to email messages, text messages, or the like, as applicable. The determination of the prediction data based on such interactions may aid in proactively assessing the user 110 and offering intervention by the enterprise system 200, such as allowing the enterprise system 200 to offer certain products and/or services when it has been determined that such products and/or services have been reviewed by the user 110 in conjunction with the data profile of the user 110, thereby indicating a need of the user 110 to attain such a product and/or service.

The triggering conditions indicated above may also be complex in nature and may include reference to multiple different variables of the personal data of the user 110 or multiple conditional relationships therebetween. As one example, upon determining that the age of the user 110 has surpassed a certain threshold, an additional variable of the personal data of the user 110, such as the balance of a savings account of the user 110 accessible to the enterprise system 200, may be utilized in determining whether the prediction data must be determined and further utilized. Specifically, with respect to the given example, the triggering of the determination of the prediction data may include the determination being made only if the age of the user 110 meets or exceeds the established threshold and the data regarding the account balance also meets or exceeds the established threshold. It should also be appreciated that the prediction data may be collected based on any combination of any of the above described conditions or events, as desired.

In some embodiments, the computing system 206 of the enterprise system 200 may continuously and automatically determine the prediction data with respect to each participating user 110 whenever the personal data set (profile) of the corresponding user 110, which may include the data regarding the user 110 that has been utilized in training the machine learning program, is indicated as having changed from a previous instance as monitored by the computing system 206. Such a change in data may refer to any of the data entries utilized by the predictive model in making a determination of any prediction data having a changed state, value, or condition. Such a change may include a changed condition of the corresponding user 110 or the initial receipt of previously unknown or undetermined information. The data that is determined to have changed may be derived from an interaction between the user 110 and the enterprise system 200 or may be acquired by the enterprise system 200 from a third-party source 202, 204. This allows the prediction data corresponding to any one user 110 to always be as up to date as possible.

With renewed reference to step 1005 of FIG. 7, the enterprise system 200 may utilize the prediction data determined with respect to each of the participating users 110 for performing a variety of different tasks once such prediction data has been determined. In some circumstances, the prediction data is communicated or otherwise reported directly to the corresponding user 110 for review by the user 110, such as a review of the predicted data privacy and/or data portability measures. In other circumstances, the prediction data is utilized by the enterprise system 200 to make determinations regarding further interactions with the user 110, initiating, continuing, and/or changing data privacy and/or data portability measures, changes in settings and/or behavior of the enterprise system 200, and changes in settings and/or behavior of one of more third-party entities.

The prediction data may be communicated to the user 110 using a number of different methods while remaining within the scope of the present invention. In some embodiments, each determination of the prediction data with respect to one of the users 110 causes the computing system 206 to associate such data with the account of the corresponding user 110, as may be associated with the web browser application or software application 132. Such prediction data may then be accessible whenever the user 110 gains access to the account of the user 110, such as may occur via browsing of the web browser application or software application 132. If such determinations are made continuously or automatically each time new or changed personal data is acquired or determined by the computing system 206 with respect to a corresponding user 110, the user 110 is able to access an up to date and semi-real time data privacy and/or data portability measures of the user 110 via access to the web browser application or software application 132. The prediction data communicated to the user 110 may include any predictions regarding data privacy and/or data portability measures related to the personal data of the corresponding user 110 for the enterprise system 200 and/or the third-party entities.

The prediction data may alternatively be proactively sent to the corresponding user 110 by the enterprise system 200 using any known communication method. For example, an email, text message, push notification, a QR code, or the like may be generated by the computing system 206 for communication to the corresponding user 110. It is understood that the QR code may be generated by any suitable QR code generator, for example. The use of the QR code will be described in further detail hereinafter. Such a communication may be communicated from the computing system 206 to the user devices, referring to either or both of the computing device 104 and mobile device 106 of the user 110 using any of the methods described hereinabove in describing the communication capabilities of the devices 104, 106 and systems 200, 206 within FIG. 1. The user 110 may then review such prediction data regarding the corresponding user 110 via interaction with the corresponding user devices, referring to either or both of the computing device 104 and mobile device 106, which provides a perceptible expression of the prediction data. Such a perceptible expression of the prediction data may include the data being visually perceptible, such as in the form of readable text able to be displayed on the user devices, referring to either or both of the computing device 104 and mobile device 106, or audibly perceptible, such as in the form of an audio file able to be played by the user devices, referring to either or both of the computing device 104 and mobile device 106. The display 140 of the user device 106 or the speaker 144 of the user device 106 may be utilized in perceiving the prediction data.

In summary, the determination of the prediction data may cause the enterprise system 200 to passively or actively communicate the prediction data to the corresponding user 110. The prediction data may be data 234 communicated from the storage device 224 of the computing system 206 for receipt by the user devices, referring to either or both of the computing device 104 and mobile device 106 of the user 110 using known data communication methods and protocols as established and described with reference to FIG. 1. The user 110 then accesses the prediction data, which may be presented visually in the form of text as displayed on the screen 140 of the user device 106 or may be audibly played for the user 110 via use of the speaker 144 of the user device 106. The prediction data accordingly forms a form of transferrable output of the machine learning program that can be communicated to the user 110 via a transfer of such prediction data (or a representation thereof) from the computing system 206 of the enterprise system 200 to the user devices, referring to either or both of the computing device 104 and mobile device 106 of the corresponding user 110.

The enterprise system 200 may determine to utilize the prediction data for performing a specific task at step 1005 depending on a variety of different factors, including the use of several triggering conditions in similar fashion to the description of when a determination of the prediction data is to be determined with respect to a user 110 as described hereinabove with respect to step 1004. Such conditions are briefly discussed hereinafter.

In some circumstances, the computing system 206 may determine that the prediction data is to be communicated to a corresponding user 110 when the personal data of the user 110 accessible to the enterprise system 200 indicates that a triggering condition has occurred. Such a communication of the prediction data following the triggering condition may occur using any of the methods described above. The triggering condition may utilize or refer to the personal data of the user 110 that is widely or publicly available, the personal data of the user 110 that is specifically accessible by the enterprise system 200 via the relationship present between the user 110 and the enterprise system 200 (such as the data regarding the account history of the user 110 with the enterprise system 200 or those recorded interactions of the user 110 with the application 330 associated with the enterprise system 200), or the personal data of the user 110 that is acquired by the enterprise system 200 from an approved third-party source. The triggering condition may include multiple conditions being met prior to the triggering condition being met, such as any combination of different thresholds of any combination of variables being met in similar fashion to the examples provided above with regards to when the machine learning model creates such prediction data.

In other circumstances, the computing system 206 may determine that the prediction data is to be communicated to the corresponding user 110 when the prediction data itself indicates that a triggering condition has occurred requiring the communication of such prediction data to the user 110. For example, if the prediction data includes certain predicted third-party entities for submission of a personal data request, the communication of the prediction data may only occur when one of the predicted third-party entities is also an approved third-party source. Specifically, the triggering event may include any one of the predicted and/or data portability indicating a need for the communication of the prediction data to the user 110 based on the specified criteria of the enterprise system 200, or any combination of such conditions.

The computing system 206 may also be configured to record each instance of the determination of the prediction data with respect to each user 110, wherein such past determinations are referred to hereinafter as the historical prediction data regarding the user 110. Such historical prediction data may be utilized in creating a triggering condition for initiating the communication of the current prediction data to the user 110. Such a triggering condition may occur when a threshold change has been determined as occurring between the historical prediction data and the current prediction data. Such a change may refer to a modification to the data privacy and/or data portability measures with respect to previous determination of the prediction data, whether such change is positive or negative, or an increase or decrease.

With respect to individual data privacy and/or data portability measures, a triggering condition may refer to a predicted data privacy and/or data portability measures corresponding to an action of the user 110 that is different from a previous iteration of such predicted data privacy and/or data portability measures, such as an opposite action being taken with respect to possible data privacy and/or data portability measures of the user 110. For example, the user 110 changing the data privacy preferences at the enterprise system 200, which then are not in alignment with or are in opposition to the data privacy preferences set at one or more third-party entities, may be indicative of such a triggering condition being met.

Additionally, if a feedback mechanism is utilized for confirming the prediction data against the current actions of the user 110 according to the described semi-supervised training process of step 1007, the feedback data regarding the responses of the user 110 to the queries of the data privacy and/or data portability measures may also be utilized as a basis for comparison to the newly determined prediction data. That is, any feedback given by the user 110 regarding a difference in any query of the data privacy and/or data portability measures may be utilized for comparison to any subsequently determined prediction data regarding that user 110, such as a change in the impression of the user 110 regarding any specific data privacy measure.

In some embodiments, the aforementioned reporting of the prediction data may further include the reporting of the historical prediction data regarding the corresponding user 110 in addition to the instantaneous prediction data based on the instantaneous personal data profile of the corresponding user 110. That is, the previously described reporting of the prediction data via the web browser or software application 132 or via the use of a communication sent to the user devices, referring to either or both of the computing device 104 and mobile device 106, may include the reporting of a plurality of the past iterations of the prediction data forming the historical prediction data, such as a record of each subsequent generation of the prediction data. Such past data, such as past predicted data privacy and/or data portability measures based on past personal data profiles of the corresponding user 110, may be displayed in list form or may be displayed graphically, as non-limiting examples.

Each instance of the generation of the prediction data, such as each instance of the generation of the predicted data privacy and/or data portability measures for the corresponding user 110, may also be displayed in accordance with information relating to the change in the personal data set of the corresponding user 110 leading to the newly predicted data. For example, if the predicted data privacy and/or data portability measures of the corresponding user 110 changes following a change in the personal data set of the corresponding user 110, such as may be indicated by the purchase of a specific product and/or service or the change of a specific account setting, the nature of the change in the personal data set may be included in the reporting of the predicted data privacy and/or data portability measures, such as listing the purchase in question or listing the nature of the change in the account setting in a manner relating such an event to the change in the predicted data privacy and/or data portability measures.

The reporting of the change in the personal data set causing such a change in the predicted data privacy and/or data portability measures may only occur when a triggering condition is met. For example, the historical prediction data may only include data regarding those changes to the personal data set of the corresponding user 110 causing a change in the predicted data privacy and/or data portability measures.

As an example of the above concepts, the user 110 may access the web browser or software application 132 to view the instantaneous predicted data privacy and/or data portability measures of the user 110 based on the most up to date personal data set of the user 110 as known by the computing system 206. The user 110 may also view the historical prediction data regarding each of the predicted data privacy and/or data portability measures regarding the user 110 that have occurred previously. In the present example, the user 110 may view a plurality of past determinations of the predicted data privacy and/or data portability measures, such as five past iterations of the generation of the data privacy and/or data portability measures based on five different changes in the personal data set of the user 110. The five different predicted data privacy and/or data portability measures may be used to determine a trend or trends occurring with respect to such changes in the personal data set. Each prediction of the data privacy and/or data portability measures may be associated with a time and date, or with a set of conditions associated with the user 110, such as certain entries of the personal data set of the user 110 when the data privacy and/or data portability measures was predicted. As a specific example, each iteration may include the ability to access the personal data set or a representation of the information included therein, such as specific account balances or account settings that the user 110 had at the time of each of the predicted data privacy and/or data portability measures. Each successive reported data privacy and/or data portability measures may also include information relating to the change in the personal data set leading to such a change. According to such exemplary iterations, the user 110 can easily determine the activities that are affecting the resulting predicted data privacy and/or data portability measures, and can model future activities on the basis of such information.

With regards to step 1005, the enterprise system 200 may also initiate alternative interactions with the user 110 beyond merely communicating the prediction data such as the data privacy and/or data portability measures to the user 110 in the forms mentioned above. Such alternative interactions may include the enterprise system 200 offering products and/or services to the user 110 in reaction to an analysis of the prediction data specific to the user 110. Such products and/or services may be provided in an attempt to intervene and improve data privacy and/or data portability measures of the user 110 as determined by the prediction data. Such products and/or services may be freely provided or may be offers for sale of said products and/or services by the enterprise system 200. In other circumstances, the enterprise system 200 may discontinue, or offer to discontinue with the permission or approval of the user 110, the availability of certain products and/or services to the user 110 in order to abide by the data privacy preferences of the user 110 as determined by the prediction data.

The determination to initiate the described alternative interactions may occur in the same manner as that described with regards the determinations to communicate the prediction data to the corresponding user 110 as described above. Specifically, the alternative interactions may be initiated by any of the triggering conditions or combinations thereof described hereinabove as initiating such a communication of the prediction data, or in initiating the generation of the prediction data via use of the predictive model. Such triggering conditions may be specifically related to the data privacy and/or data portability measures as a part of the alternative interaction. For example, the computing system 206 may alternatively alter the account settings of the user 110 in a manner altering a manner in which the computing system 206 interacts with the user 110 via the corresponding user devices, referring to either or both of the computing device 104 and mobile device 106, in response to the generation of the prediction data regarding the user 110. In some instances, such account setting changes may include changing the settings relating to the frequency of communications sent from the computing system 206 to the user 110 for access via the user devices, referring to either or both of the computing device 104 and mobile device 106, under what conditions to communicate with the user 110, the content of such communications, the types or forms of such communications, the manner in which the interface of the web browser application or software application 132 displays information to the user 110, or the information or resources accessible to the user 110 via navigation of the web browser application or software application 132, as non-limiting examples. The changing of the account settings may refer to the computing system 206 altering the account related data stored as a form of the data 234 associated with the storage device 224, which in turn results in a reconfiguring of the operation of the computing system 206 with regards to how the computing system 206 subsequently interacts with the user devices, referring to either or both of the computing device 104 and mobile device 106 with respect to at least one variable.

The predictive model of the machine learning program as described herein also provides the ability for the computing system 206 of the enterprise system 200 to perform various evaluative processes for determining how best to interact with the user 110 for abiding by the data privacy preferences of the user 110. That is, the predictive model may be utilized to determine which actions should be taken by the computing system 206 in order to positively alter the prediction data regarding the specific user 110, such as reversing a negative impression of the user 110 regarding data privacy between the user 110, the enterprise system 200, its affiliates, and/or third-party entities.

Operations of the methods, and combinations of operation in the methods, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the method.

Figure 8:
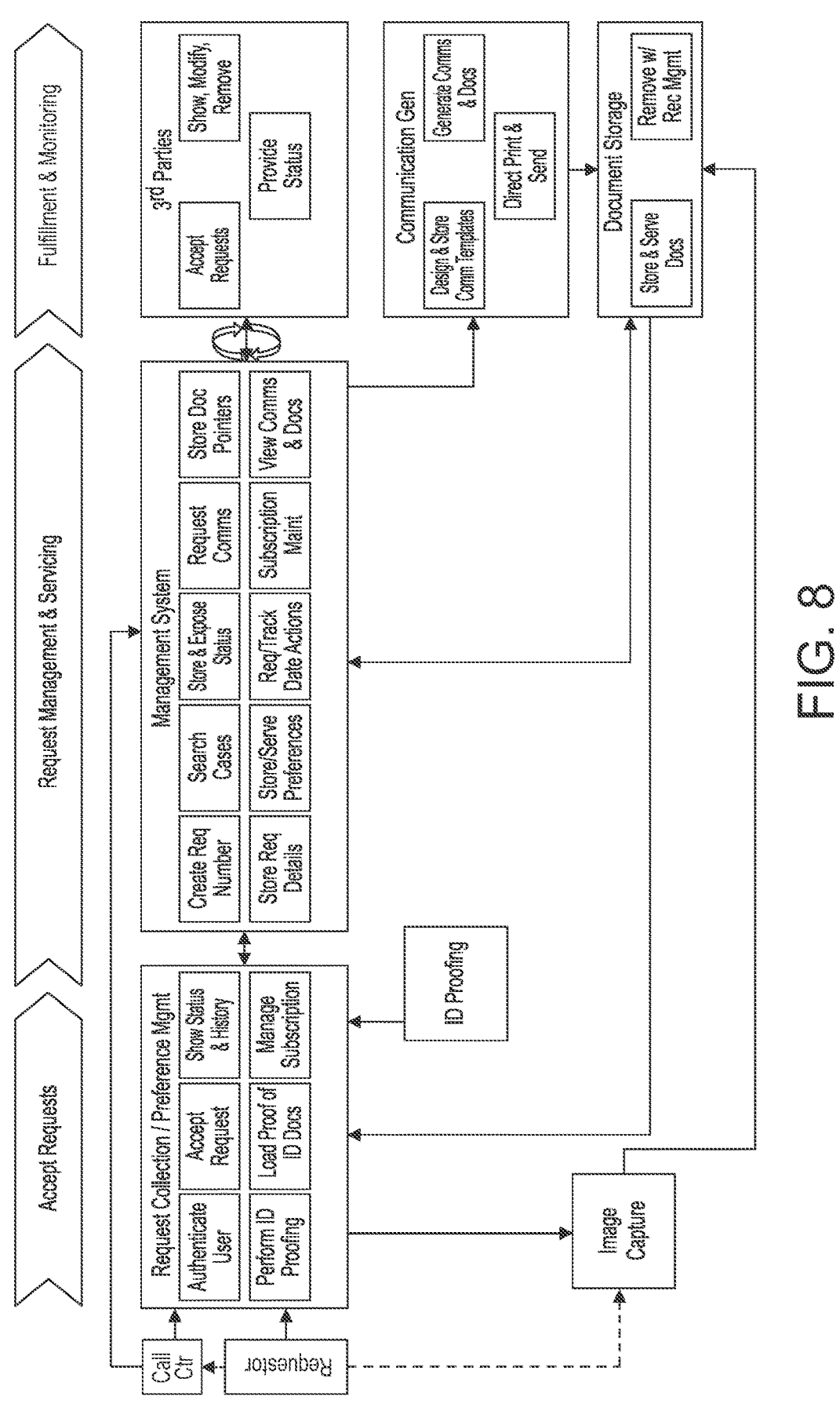
FIG. 8 is a diagram illustrating a high-level process flow of an exemplary embodiment of data privacy application of FIGS. 1-7.
Figure 9A:
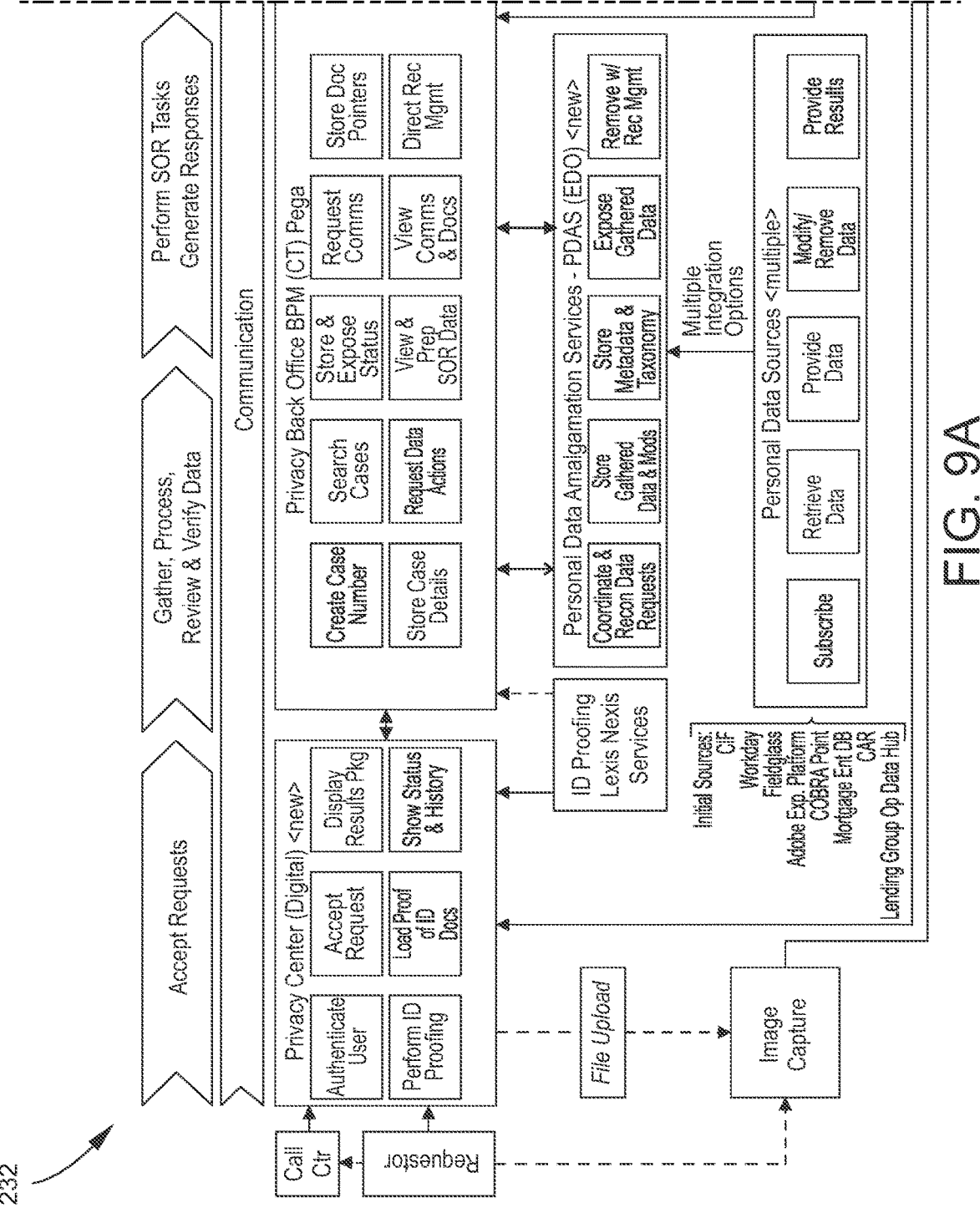
FIGS. 9A and 9B is a diagram illustrating a high-level process flow of another exemplary embodiment of data privacy application of FIGS. 1-7.
Figure 9B:
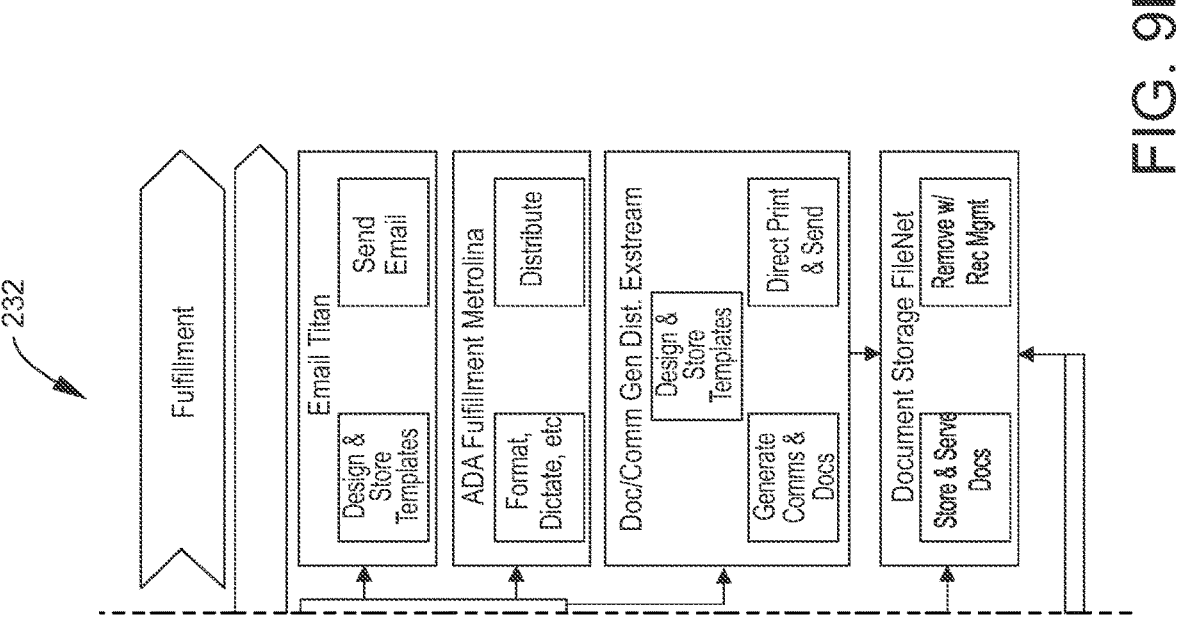

As described hereinabove, one of the programs 230 of the enterprise system 200 may be the data privacy application 232. Exemplary embodiments of the data privacy application 232 are depicted in FIGS. 8 and 9A-9B. The data privacy application 232 may be used by an enterprise to provide the users 110 with increased transparency, control, and insights into use and protection of their personal data and information. In an example embodiment, the data privacy application 232 may be accessed via a graphical user interface (GUI) of a computing device, for example, the computing device 104 and/or the mobile device 106 of the user 110 of FIG. 1. It is understood that the data privacy application 232 may be a subscription-based application.

In some embodiments, the data privacy application 232 may utilize and/or be in communication with various data resources within the enterprise system 200 and/or the third-party entities, including but not limited to a privacy preferences and consent management module, a customer information file (CIF), a workday module for employee data, an Adobe experience platform, an insurance module (e.g., Cobra Point), contractor data (e.g., Fieldglass), a mortgage enterprise database, a client analysis report (CAR), at least one of the applications 230 upstream of the data privacy application 232, at least one third-party system (e.g., Lex-isNexis), an enterprise data lake (EDL), EDL whole files, a data filter, a custom data module (CDM), at least one of the applications 230 downstream of the data privacy application 232, and a marketing module. It should be appreciated that the data privacy application 232 may utilize more or less of the applications 230 and/or the systems 202, 204 of the enterprise system 200.

In certain instances, the user 110 may execute the data privacy application 232 using the user device (referring to either or both of the computing device 104 and the mobile device 106). An initial landing page of the data privacy application 232 may be provided on the display 140 via the GUI. The user 110 selects, via the GUI, whether to log into the data privacy application 232 as an authenticated user or as an unauthenticated user. To proceed when the user 110 is authenticated, the user 110 inputs credentials into the data privacy application 232, via the GUI. Various credentials may be required such a username and a password in order to further access the data privacy application 232. Alternatively, to proceed when the user 110 is unauthenticated, the user 110 may input personally identifiable information (PII) data (e.g., first name, last name, social security number, telephone number, email, date of birth, address, city, state, zip code, identification document number, and the like), via the GUI, into the data privacy application 232. Once the credentials have been verified or the PII data has been inputted, a personal or a generic dashboard, respectively, may be provided via the GUI.

From the dashboard, the user 110 may select one of the data privacy measures (e.g. an information sharing or data privacy preferences feature) and/or a personal data request (PDR) feature for PII data of the user 110.

In some embodiments, the data privacy measures allow the user 110 to set desired preferences to control access and/or use of the personal data of the user 110 by the enterprise system 200 and/or one or more third-party entities. When the user 110 desires to limit and/or control the personal data accessed and/or used by the enterprise system 200 and/or the one or more third-party entities, the data privacy preferences feature of the privacy data application 232 is initiated, via the GUI. In circumstances when the user 110 has not previously set the data privacy preferences, the user 110 is prompted to initiate a new request. The user 110 first selects which data privacy preferences provided by the data privacy application 232, via the GUI, are desired. Since the data privacy application 232 and/or the enterprise system 200 is extensible and flexible, the data privacy preferences are not static preferences, and can be updated by adding new preferences and/or deleting the existing preferences, or replacing preferences with the new preferences. An acknowledgement communication of the data privacy measures selected may be transmitted to the user 110. The acknowledgment communication may contain a QR code embedded with the data privacy preferences of the user or a link thereto on the data privacy application 232. It is understood that the communication and/or the QR code may be automatically generated. It is further understood that the communication may be transmitted by various means such as by an electronic communication (e.g., an email, text message, push notification, or the like etc.) and/or a tangible communication (e.g., U.S. mail), for example. Upon completion of the selection of the data privacy measures, the user 110 may then close the data privacy measures module and return to manage other preferences and data, and/or logout of the data privacy application 232.

In some circumstances, the users 110 may select the PDR feature from the dashboard of the data privacy application 232. The PDR feature allows users 110 to request, via the data privacy application 232, usage data related to the PII data of the user 110. The PII data may include sensitive data and domain specific data. Herein, the PII data may refer to the data that may be utilized for determining identity of the user. Examples of fields including the PII data in case of the data privacy application 232 may include permanent account numbers, date of birth, e-mail address, residential address, and mobile numbers, for example. The PII data may also include data that can pose a risk or affect the user 110 financially or otherwise, if disclosed in public. In an embodiment, the PII data may include domain specific fields, and can be generated by the enterprise. Examples of the PII data for a financial institution such as a bank may include financial information such as debit and/or credit card numbers, CVV number, account balance, card expiry date, and other such fields, for example. As depicted, the data privacy application 232 may receive one or more PDRs from a requestor. The requestor may be one of the users 110 or the agents 210 of the enterprise system 200. The PII data may be provided by various data sources to the data privacy application 232. Suppression rules and criteria are applied to the collected PII data and the PII data is suppressed, scrubbed, and/or filtered. The filtered PII data may then be outputted to the user 110 and/or stored by the data privacy application 232 for fulfillment.

In some embodiments, the privacy data application 232 allows the requestors, including the users 110 (e.g., authenticated and unauthenticated users) and/or the agents 210 of the enterprise system 200, to request and receive communications related to the usage of the PII data. Oftentimes, it is a request by the user 110 to view, delete, and/or correct the personal data of the user 110 that has been collected and/or stored by the enterprise system 200 and/or one or more third-party entities. As described hereinabove, the PII data may include sensitive data, domain specific data, demographic data, and/or behavioral data. The authenticated users 110 may be an individual and/or entity that has an online user ID. The unauthenticated users 110 (e.g. guests) may be those without an online user ID or entirely new users of the application 232. As described hereinafter, the communications may include a QR code embedded with either details as to how the PII data of the users 110 is being used by the enterprise system 200 and/or third-parties entities or a link to such details in the data privacy application 232.

From the personal dashboard, the user 110 may initiate a request for a communication and/or any accessibility needs (e.g., large font, etc.). When the request is initiated, the user 110, may receive a confirmation, for example, a confirmation page that the request has been submitted and/or a request identification number. An acknowledgement communication may be transmitted to the user 110. The acknowledgment communication may contain a QR code. The communication and/or the QR code may be automatically generated. Additionally, the communication and/or the QR code may be transmitted by various means such as by an electronic communication (e.g., an email, text message, push notification, or the like etc.) and/or a tangible communication (e.g., U.S. mail), for example. Upon completion of the communications request related to usage of the PII data, the user 110 may then close the PDR module and return to manage other preferences and data, and/or logout of the data privacy application 232.

If the user 110 is not an authenticated user 110, the user 110 may login as an unauthenticated user or guest or, alternatively, by contact with at least one of the agents 210 (i.e., via telephonic means). Similar to the login as the authenticated user, the data privacy application 232 may require an input of certain credentials. When the user 110 is logged in as the unauthenticated user or guest or contacts the at least one of the agents 210, a generic dashboard may be provided to the user 110 or the at least one agents 210. The generic dashboard may include a generic landing page of the data privacy application 232.

From the generic dashboard, the user 110 or the at least one agent 210 may initiate a request for a communication and/or any accessibility needs (e.g., large font, etc.). When the request is initiated, the user 110 or the at least one agent 210, may receive a confirmation, for example, a confirmation page that the request has been submitted and/or a request identification number. An acknowledgement communication may be transmitted to the user 110. The acknowledgment communication may contain a QR code that may be embedded with either the acknowledgement or a link to the acknowledgement on the data privacy application 232. The communication and/or the QR code may be automatically generated. Additionally, the communication and/or the QR code may be transmitted by various means such as by an electronic communication (e.g., an email, text message, push notification, or the like etc.) and/or a tangible communication (e.g., U.S. mail), for example. Upon completion of the communications request related to the usage of the PII data, the user 110 and/or the at least one agent 210 may then close the PDR module and return to manage other preferences and data, and/or logout of the data privacy application 232.

Thereafter, the credentials of the user 110 may be subjected to a validation process. In some embodiments, the validation process may be conducted by a third-party application such as LexisNexis, for example. The validation process may require validation of all of the credentials of the user 110, or only a portion thereof. For example, if the credentials include five criteria items, the validation process may only require three of those five criteria items to be accurate. When the credentials do not pass the validation process, an internal communication may be transmitted to a decline queue of the data privacy application 232. The internal communication may be held in the decline queue for a predetermined period of time (i.e., a number of days or weeks). After expiration of the predetermined period of time, a communication containing notification of the decline of the request for the usage data related to the PII data may be transmitted to the user 110. It is understood that the communication may include a QR code embedded with either the notification of the decline of the communications request for the usage data of the PII data or a link to the notification on the data privacy application 232. The communication and/or the QR code may be automatically generated. The communication including the QR code may be transmitted to the user 110 via various means such as by an electronic communication (e.g., an email, text message, push notification, or the like etc.) and/or a tangible communication (e.g., U.S. mail), for example. Once the communication of the declination of the communications request is transmitted to the user 110, the data privacy application 232 is ended.

When the credentials pass the validation process, at least one of the agents 210 of the enterprise system 200 may review the request for the usage data of the PII data and/or any identification documentation included therewith. The data privacy application 232 then determines whether user identification documentation still is required to be submitted. If yes, the at least one of the agents 210 of the enterprise system 200 transmits a request for such identification documentation. In some embodiments, the request for such identification documentation may be made through a communication including a QR code. If additional identification documentation is not required, the submitted identification documentation is examined for legality. If the submitted identification documentation is determined to be legally insufficient, a communication containing notification of the decline of the communication request for the usage data of the PII data may be transmitted to the user 110. In some embodiments, the communication includes a QR code embedded with either the notification of the decline of the communication request for the usage data of the PII data or a link thereto on the data privacy application 232. It is understood that the communication and/or the QR code may be automatically generated and transmitted via various means such as by an electronic communication (e.g., an email, text message, push notification, or the like etc.) and/or a tangible communication (e.g., U.S. mail), for example. Once the communication of the declination of the communications request is transmitted to the user 110, the data privacy application 232 is ended. Conversely, if the submitted identification documentation is determined to be legally sufficient, the data privacy application 232 proceeds.

Once the communications request for the usage data of the PII data is initiated by the user 110 and/or verified by the data privacy application 232, the data privacy application 232 commences a collection of the PII data. The PII data collection may be conducted by the data privacy application 232 via the APIs. In some instances, the data privacy application 232 may be in communication various the data resources within the enterprise system 200 and/or the third-party entities. One or more of the data resources within the enterprise system 200 and/or the third-party entities may transmit the collected PII data to the data privacy application 232. The collected PII data may be communicated via the APIs. In some embodiments, the collected PII data may be filtered. An external facing taxonomy (EFT tool) may be employed to conduct the filtering of the collected PII data. In certain embodiments, the collected PII data may be compared to predetermined rules and/or criteria to delete unnecessary and/or undesired segments of the PII data. The filtered PII data is transformed by the data privacy application 232 into a communication having usage data related to the filtered PII data or a link thereto on the data privacy application 232 embedded into a QR code. In some embodiments, the communication containing the QR code may then be reviewed for quality assurance. When the communication containing the QR code embedded with either the usage data of the filtered PII data and/or the link thereto does not meet quality assurance standards, a notification with concerns is transmitted to at least one of the agents 210 of the enterprise system 200. Thereafter, the collected PII data may be further filtered to address the concerns provided in the notification transmitted. Such filtering of the PII data may be repeated until the communication containing the QR code meets the quality assurance standard. When the communication meets the quality assurance standards, the QR code embedded with either the usage data related to the filtered PII data and/or the link thereto on the data privacy application 232 may then be transmitted to the user 110 and/or hosted on the personal dashboard of the user 110 by the privacy data application 232. It is understood that any or all of the QR codes described hereinabove may not be embedded with the specific acknowledgements, notifications, or specific usage data of the filtered PII data, but instead perform as a link to the specific data or to a specific location on the personal dashboard on the privacy data application 232 that the specific data is provided.

Figure 11:
FIGS. 11 and 12 are graphical illustrations showing exemplary communications including a QR code provided by the data privacy application.
Figure 12:

When the user 110 is determined to have a login to the data privacy application 232, either by being an authenticated user 110 or an agent 210, a communication containing the QR code may be directly transmitted thereto. In preferred embodiments, the communication may be transmitted via an email, text message, push notification, or the like, and contains the QR code that is embedded with the usage data or links to the data privacy application 232 and/or allows the user 110 and/or the agent 210 to access and/or view the usage data of the PII data of the user 110. Exemplary graphical representations of the communications are depicted in FIGS. 11 and 12. In some instances, the QR code permits substantially instantaneous access and viewing of the usage data of the PII data of the user 110. Upon transmittal of the communication containing the QR code, the data privacy application 232 is ended.

When the user 110 does not have a login to the data privacy application 232, a communication containing the QR code may be transmitted to the user 110 via secured electronic mail and/or U.S. mail with tracking. Upon transmittal of the communication containing the QR code, the data privacy application 232 is ended.

The use of the QR code along with the data privacy application 232 may be a mechanism to provide the users 110 with transparency into the PII data collected by the enterprise system 200 and how it is used as well as an understanding of how privacy and security are handled. The use of the QR code for data portability will enable compliance with regulatory requirements, build trust and secure market share, enabling a broader, more dynamic use of the PII data. More importantly, the QR code for data portability provides a positive user experience. Features of the the QR code for data portability are expandable as user expectations and privacy regulations evolve over time.

In an embodiment, the enterprise system 200 may be caused to transmit a communication containing the QR code based at least on one of a plurality of preconfigured rules and criteria. In an embodiment, the plurality of preconfigured rules and criteria may be defined based on a user input and/or regulations. Since the enterprise system 200 is extensible and flexible, the communications containing the QR code defined herein are not static, and can be updated by adding, deleting, and/or replacing rules and criteria.

Advantageously, the QR code permits the user 110 to easily view the PII data of the user device, referring to either or both of the computing device 104 and the mobile device 106, in a secured manner. In some instances, the QR code is more secured through password protection and/or an embedded logo for authenticity. The encoded information in the QR code is also not easily accessed by unintended recipients of the communication including the QR code. Accordingly, the QR code reduces email vulnerability risk and avoids loss of data through traditional mechanisms. Use of the QR code may also save cost by eliminating the need for electronic and/or tangible communications. Additionally, the QR code provides an effective option to communicate with the user 110 across the digital and retail footprint. It expands a capability of the enterprise system 200 to provide offerings tailored to the user 110. As discussed hereinabove, the QR code also provides marketing opportunity by enhancing digital advertising and brand recognition by utilizing the brand and/or logo as part of the QR code.

The enterprise system 200 similarly benefits from the disclosed methods as a result of the reduction in the need for additional customer or client engagement by bypassing the need to request multiple data privacy preferences and/or personal data requests from each user 110, or any at all, depending on the circumstances. The disclosed method also ensures that the most appropriate or useful actions be taken by the enterprise system 200 such that the impression of the enterprise system 200 related to data portability is improved with respect to the user 110. The enhanced privacy protection and control of the personal data of the user 110 related to data portability may also facilitate an improvement in the relationship between the enterprise system 200 and the user 110.

The use of the machine learning program and resulting predictive model also improves the efficiency of the operation of the computing system 206 in various different respects. First, the disclosed method provides an ability for the computing system 206 to eliminate unnecessary calculations and communications relating to certain tasks performed by the computing system 206 that have been found to not have a positive improvement on the corresponding impression of the user 110. The computing system 206 may be configured to automatically introduce changes to data portability via the review of such prediction data. This results in the computing system 206 avoiding a waste of resources when performing certain tasks, such as sending unnecessary communications of various forms to users 110 that will never interact with or benefit from the sending of such communications.

Further, the disclosed methods eliminate unnecessary time, effort, and communications relating to certain tasks performed by the human agents 210 and/or the computing system 206 that have been found to not have a positive impact on securing desired product and/or services from the users 110 and/or securing the usage data for the personal data of the user 110 from the various third-party entities. This may be especially relevant where extensive costs can be avoided by sending communication of various forms to correct users 110, as well as verifying requestor credentials and filtering the personal data of the user 110 prior to transmittal of any communication. This results in the human agents 210 and the computing system 206 avoiding a waste of resources when performing certain tasks, such as sending unwanted communications to users 110 that will never interact with or benefit from communications from the enterprise system 200. The use of the data privacy application 232 also allows for certain variables in the personal data of the user 110 to be determined to be private and further allows for the computing system 206 to be simplified by means of the elimination of undesired interactions. Additionally, the data privacy application 232 provides greater insight to the users 110 with respect to usage of their personal data by the third-party entities. Each of the described advantages reduces network traffic as experienced by the computing system 206 due to the ability to manage data privacy of the user 110 via the data privacy application 232 via the GUI.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for displaying a data privacy dashboard, comprising:
  a computing system including at least one processor and at least one memory device including computer-readable instructions, wherein the at least one processor is in communication with at least one user device via a network connection;
  wherein the at least one processor is configured to:
  display the data privacy dashboard on the at least one user device, where the data privacy dashboard includes at least one of data privacy measures and a personal data request feature;
  collect privacy data related to the at least one of the data privacy measures and the personal data request feature;
  generate a predictive model during training of a machine learning program including a neural network of the machine learning program, wherein a training data set utilized during the training of the machine learning program comprises a personal data set of at least one user;
  predict, by the predictive model, at least one predicted data portability measure of the at least one user associated with the at least one user device based upon the personal data set of the at least one user;

generate a quick response code embedded with at least one of the privacy data and a link to the privacy data based upon the at least one predicted data portability measure; and
  transmit the at least one quick response code embedded with at least one of the privacy data and the link to the privacy data to the at least one user device.

2. The system of claim 1, wherein the at least one processor is configured to receive identification of the user via an application accessible by the at least one user device.

3. The system of claim 1, wherein the at least one processor is configured to verify identification of the user of an application accessible by the at least one user device.

4. The system of claim 1, wherein the at least one processor is configured to filter the privacy data prior to transmission to the at least one user device.

5. The system of claim 1, wherein the at least one processor is configured to filter the privacy data prior to generating the at least one quick response code.

6. The system of claim 1, wherein the at least one processor is configured to host the at least one quick response code embedded with the usage data on an application accessible by the at least one user device.

7. The system of claim 1, wherein the at least one processor is configured to display the at least one quick response code on a graphical user interface of the at least one user device.

8. The system of claim 1, wherein the at least one processor is configured to translate the at least one quick response code into human-readable data upon tactile engagement of the at least one quick response code displayed on a graphical user interface of the at least one user device.

9. The system of claim 8, wherein the at least one processor is configured to display the human-readable data on the graphical user interface of the at least one user device.

10. The system of claim 1, wherein the at least one processor is configured to require authentication to access and/or view the embedded data.

11. The system of claim 10, wherein the authentication has multiple levels of authentication.

12. The system of claim 10, wherein the authentication includes at least one of a username, a password, a pin, biometric information, and a security token.

13. The system of claim 10, wherein the authentication is inputted into a graphical user interface of the at least one user device.

14. The system of claim 1, wherein the at least one quick response code includes at least one an identifier of the enterprise system.

15. The system of claim 1, wherein the source of the privacy data is the enterprise system.

16. The system of claim 1, wherein the source of the privacy data is a third-party entity.

17. The system of claim 1, wherein the at least one quick response code is accessible to the user via the privacy dashboard.

18. A method for displaying a data privacy dashboard, comprising:
  providing a computing system including at least one processor and at least one memory device including computer-readable instructions, wherein the at least one processor is in communication with at least one user device via a network connection;

displaying the data privacy dashboard on the at least one user device, where the data privacy dashboard includes at least one of data privacy measures and a personal data request feature;

collecting privacy data related to the at least one of the data privacy measures and the personal data request feature;

generating a predictive model during training of a machine learning program including a neural network of the machine learning program, wherein a training data set utilized during the training of the machine learning program comprises a personal data set of at least one user;

predicting, by the predictive model, at least one predicted data portability measure of the at least one user associated with the at least one user device based upon the personal data set of the at least one user;

generating at least one quick response code embedded with at least one of the privacy data and a link to the privacy data based upon the at least one predicted data portability measure; and transmitting the at least one quick response code embedded with at least one of the privacy data and the link to the privacy data to the at least one user device.

* * * * *